US009866924B2

(12) United States Patent
Grant et al.

(10) Patent No.: US 9,866,924 B2
(45) Date of Patent: Jan. 9, 2018

(54) SYSTEMS AND METHODS FOR ENHANCED TELEVISION INTERACTION

(71) Applicants: Danny Grant, Laval (CA); Pamela Pimentel, Laval (CA); Eric Gervais, Montreal (CA); Vincent Levesque, Montreal (CA); Aaron Kapelus, Montreal (CA); Mina Chang, San Jose, CA (US); Daniel Parker, San Jose, CA (US); David Birnbaum, Oakland, CA (US); Li Jiang, Union City, CA (US); Stephen Rank, San Jose, CA (US)

(72) Inventors: Danny Grant, Laval (CA); Pamela Pimentel, Laval (CA); Eric Gervais, Montreal (CA); Vincent Levesque, Montreal (CA); Aaron Kapelus, Montreal (CA); Mina Chang, San Jose, CA (US); Daniel Parker, San Jose, CA (US); David Birnbaum, Oakland, CA (US); Li Jiang, Union City, CA (US); Stephen Rank, San Jose, CA (US)

(73) Assignee: Immersion Corporation, San Jose, CA (US)

( * ) Notice: Subject to any disclaimer, the term of this patent is extended or adjusted under 35 U.S.C. 154(b) by 0 days.

(21) Appl. No.: 13/827,850

(22) Filed: Mar. 14, 2013

(65) Prior Publication Data
US 2014/0267911 A1 Sep. 18, 2014

(51) Int. Cl.
*H04N 21/81* (2011.01)
*H04N 21/488* (2011.01)
(Continued)

(52) U.S. Cl.
CPC ........... *H04N 21/8186* (2013.01); *G08B 6/00* (2013.01); *H04N 5/4403* (2013.01);
(Continued)

(58) Field of Classification Search
CPC ........... H04N 21/8133; H04N 21/8106; H04N 21/8166; H04N 21/8173; H04N 21/8186
See application file for complete search history.

(56) References Cited

U.S. PATENT DOCUMENTS 2,524,782 A   10/1950   Ferrar et al.
3,490,059 A    1/1970   Paulsen et al.
(Continued)

FOREIGN PATENT DOCUMENTS

CN   1543096   11/2004
CN   1599925   12/2008
(Continued)

OTHER PUBLICATIONS

Adelstein, B., A Virtual Environment System for the Study of Human Arm Tremor, Submitted to the Dept. of Mechanical Engineering in partial fulfillment of the requirements for the degree of Doctor of Philosophy at the Massachusetts Institute of Technology, Jun. 1989, pp. 1-253.
(Continued)

*Primary Examiner* — Pankaj Kumar
*Assistant Examiner* — Usha Raman
(74) *Attorney, Agent, or Firm* — Kilpatrick Townsend & Stockton LLP

(57) ABSTRACT

Systems and methods for enhanced television interaction are disclosed. For example, one disclosed method includes receiving notification information, the notification information indicating an event associated with video content displayed by a television device; determining a haptic effect associated with the notification information; generating and transmitting a haptic signal to a haptic output device, the haptic signal configured to cause the haptic output device to output the haptic effect.

33 Claims, 13 Drawing Sheets

(51) Int. Cl.
  *H04N 21/41* (2011.01)
  *H04N 21/44* (2011.01)
  *H04N 21/422* (2011.01)
  *H04N 21/4788* (2011.01)
  *G08B 6/00* (2006.01)
  *H04N 5/44* (2011.01)

(52) U.S. Cl.
  CPC ... *H04N 21/4122* (2013.01); *H04N 21/42201* (2013.01); *H04N 21/42222* (2013.01); *H04N 21/44008* (2013.01); *H04N 21/4788* (2013.01); *H04N 21/4882* (2013.01); *H04N 21/4884* (2013.01); *H04N 21/8133* (2013.01); *H04N 21/4126* (2013.01)

(56) References Cited

U.S. PATENT DOCUMENTS

| | | |
|---|---|---|
| 3,623,046 A | 11/1971 | Scourtes |
| 3,875,488 A | 4/1975 | Crocker et al. |
| 4,050,265 A | 9/1977 | Drennen et al. |
| 4,103,155 A | 7/1978 | Clark |
| 4,125,800 A | 11/1978 | Jones |
| 4,148,014 A | 4/1979 | Burson |
| 4,311,980 A | 1/1982 | Prusenziati |
| 4,385,836 A | 5/1983 | Schmitt |
| 4,391,282 A | 7/1983 | Ando et al. |
| 4,400,790 A | 8/1983 | Chambers et al. |
| 4,443,952 A | 4/1984 | Schulien et al. |
| 4,546,347 A | 10/1985 | Kirsch |
| 4,637,264 A | 1/1987 | Takahashi et al. |
| 4,639,884 A | 1/1987 | Sagues |
| 4,678,908 A | 7/1987 | LaPlante |
| 4,680,466 A | 7/1987 | Kuwahara et al. |
| 4,692,726 A | 9/1987 | Green et al. |
| 4,695,266 A | 9/1987 | Hui |
| 4,699,043 A | 10/1987 | Violante De Dionigi |
| 4,712,101 A | 12/1987 | Culver |
| 4,724,715 A | 2/1988 | Culver |
| 4,728,954 A | 3/1988 | Phelan et al. |
| 4,734,685 A | 3/1988 | Watanabe |
| 4,776,701 A | 10/1988 | Pettigrew |
| 4,794,384 A | 12/1988 | Jackson |
| 4,795,907 A | 1/1989 | Kitazawa |
| 4,799,055 A | 1/1989 | Nestler et al. |
| 4,803,413 A | 2/1989 | Kendig et al. |
| 4,811,608 A | 3/1989 | Hilton |
| 4,815,006 A | 3/1989 | Andersson et al. |
| 4,819,195 A | 4/1989 | Bell et al. |
| 4,823,106 A | 4/1989 | Lovell |
| 4,825,157 A | 4/1989 | Mikan |
| 4,840,634 A | 6/1989 | Muller et al. |
| 4,851,771 A | 7/1989 | Ikeda et al. |
| 4,860,051 A | 8/1989 | Taniguchi et al. |
| 4,891,889 A | 1/1990 | Tomelleri |
| 4,906,843 A | 3/1990 | Jones et al. |
| 4,914,976 A | 4/1990 | Wyllie |
| 4,935,725 A | 6/1990 | Turnau |
| 4,935,728 A | 6/1990 | Kley |
| 4,937,685 A | 6/1990 | Barker et al. |
| 4,940,234 A | 7/1990 | Ishida et al. |
| 4,962,448 A | 10/1990 | DeMaio et al. |
| 4,964,837 A | 10/1990 | Collier |
| 4,965,446 A | 10/1990 | Vyse |
| 4,982,504 A | 1/1991 | Soderberg et al. |
| 5,006,703 A | 4/1991 | Shikunami et al. |
| 5,024,626 A | 6/1991 | Robbins et al. |
| 5,053,975 A | 10/1991 | Tsuchihashi et al. |
| 5,062,830 A | 11/1991 | Dunlap |
| 5,065,145 A | 11/1991 | Purcell |
| 5,068,529 A | 11/1991 | Ohno et al. |
| 5,079,845 A | 1/1992 | Childers |
| 5,086,197 A | 2/1992 | Liou |
| 5,095,303 A | 3/1992 | Clark et al. |
| 5,107,080 A | 4/1992 | Rosen |
| 5,113,179 A | 5/1992 | Scott-Jackson et al. |
| 5,116,051 A | 5/1992 | Moncrief et al. |
| 5,125,261 A | 6/1992 | Powley |
| 5,132,927 A | 7/1992 | Lenoski et al. |
| 5,138,154 A | 8/1992 | Hotelling |
| 5,139,261 A | 8/1992 | Openiano |
| 5,148,377 A | 9/1992 | McDonald |
| 5,155,423 A | 10/1992 | Karlen et al. |
| 5,168,268 A | 12/1992 | Levy |
| 5,182,557 A | 1/1993 | Lang |
| 5,195,179 A | 3/1993 | Tokunaga |
| 5,195,920 A | 3/1993 | Collier |
| 5,202,961 A | 4/1993 | Mills et al. |
| 5,204,600 A | 4/1993 | Kahkoska |
| 5,209,131 A | 5/1993 | Baxter |
| 5,216,337 A | 6/1993 | Orton et al. |
| 5,223,658 A | 6/1993 | Suzuki |
| 5,229,836 A | 7/1993 | Nagano |
| 5,230,623 A | 7/1993 | Guthrie et al. |
| 5,235,868 A | 8/1993 | Culver |
| 5,239,249 A | 8/1993 | Ono |
| 5,246,316 A | 9/1993 | Smith |
| 5,247,648 A | 9/1993 | Watkins et al. |
| 5,254,919 A | 10/1993 | Bridges et al. |
| 5,275,565 A | 1/1994 | Moncrief |
| 5,280,276 A | 1/1994 | Kwok |
| 5,284,330 A | 2/1994 | Carlson et al. |
| 5,289,273 A | 2/1994 | Lang |
| 5,296,846 A | 3/1994 | Ledley |
| 5,313,229 A | 5/1994 | Gilligan et al. |
| 5,313,230 A | 5/1994 | Venolia et al. |
| 5,317,336 A | 5/1994 | Hall |
| 5,329,289 A | 7/1994 | Sakamoto et al. |
| 5,341,459 A | 8/1994 | Backes |
| 5,351,692 A | 10/1994 | Dow et al. |
| 5,359,193 A | 10/1994 | Nyui et al. |
| 5,374,942 A | 12/1994 | Gilligan et al. |
| 5,379,663 A | 1/1995 | Hara |
| 5,384,460 A | 1/1995 | Tseng |
| 5,390,128 A | 2/1995 | Ryan et al. |
| 5,390,296 A | 2/1995 | Crandall et al. |
| 5,396,267 A | 3/1995 | Bouton |
| 5,397,323 A | 3/1995 | Taylor et al. |
| 5,398,044 A | 3/1995 | Hill |
| 5,402,499 A | 3/1995 | Robison et al. |
| 5,402,582 A | 4/1995 | Raab |
| 5,402,680 A | 4/1995 | Korenaga |
| 5,417,696 A | 5/1995 | Kashuba et al. |
| 5,428,748 A | 6/1995 | Davidson et al. |
| 5,436,542 A | 7/1995 | Petelin et al. |
| 5,436,640 A | 7/1995 | Reeves |
| 5,452,615 A | 9/1995 | Hilton |
| 5,457,479 A | 10/1995 | Cheng |
| 5,457,793 A | 10/1995 | Elko et al. |
| 5,467,763 A | 11/1995 | McMahon et al. |
| 5,473,344 A | 12/1995 | Bacon et al. |
| 5,474,082 A | 12/1995 | Junker |
| 5,481,914 A | 1/1996 | Ward |
| 5,491,477 A | 2/1996 | Clark et al. |
| 5,512,919 A | 4/1996 | Araki |
| 5,514,150 A | 5/1996 | Rostoker |
| 5,524,195 A | 6/1996 | Clanton, III et al. |
| 5,526,022 A | 6/1996 | Donahue et al. |
| 5,530,455 A | 6/1996 | Gillick et al. |
| 5,543,821 A | 8/1996 | Marchis et al. |
| 5,547,383 A | 8/1996 | Yamaguchi |
| 5,550,562 A | 8/1996 | Aoki et al. |
| 5,550,563 A | 8/1996 | Matheny et al. |
| 5,570,111 A | 10/1996 | Barrett et al. |
| 5,576,727 A | 11/1996 | Rosenberg et al. |
| 5,583,407 A | 12/1996 | Yamaguchi |
| 5,591,924 A | 1/1997 | Hilton |
| 5,592,401 A | 1/1997 | Kramer |
| 5,604,345 A | 2/1997 | Matsuura |
| 5,611,731 A | 3/1997 | Bouton et al. |
| 5,623,582 A | 4/1997 | Rosenberg |
| 5,623,642 A | 4/1997 | Katz et al. |
| 5,627,531 A | 5/1997 | Posso et al. |
| 5,628,686 A | 5/1997 | Svancarek et al. |

(56) References Cited

U.S. PATENT DOCUMENTS

| | | |
|---|---|---|
| 5,635,897 A | 6/1997 | Kuo |
| 5,638,421 A | 6/1997 | Serrano et al. |
| 5,652,603 A | 7/1997 | Abrams |
| 5,666,138 A | 9/1997 | Culver |
| 5,680,141 A | 10/1997 | Didomenico et al. |
| 5,691,747 A | 11/1997 | Amano |
| 5,694,153 A | 12/1997 | Aoyagi et al. |
| 5,722,071 A | 2/1998 | Berg et al. |
| 5,724,106 A | 3/1998 | Autry et al. |
| 5,724,264 A | 3/1998 | Rosenberg et al. |
| 5,734,108 A | 3/1998 | Walker et al. |
| 5,740,083 A | 4/1998 | Anderson et al. |
| 5,745,057 A | 4/1998 | Sasaki et al. |
| 5,749,577 A | 5/1998 | Couch et al. |
| 5,755,620 A | 5/1998 | Yamamoto et al. |
| 5,763,874 A | 6/1998 | Luciano et al. |
| 5,767,836 A | 6/1998 | Scheffer et al. |
| 5,771,037 A | 6/1998 | Jackson |
| 5,795,228 A | 8/1998 | Trumbull et al. |
| 5,808,568 A | 9/1998 | Wu |
| 5,808,603 A | 9/1998 | Chen |
| 5,818,426 A | 10/1998 | Tierney et al. |
| 5,825,305 A | 10/1998 | Biferno |
| 5,828,295 A | 10/1998 | Mittel et al. |
| 5,831,593 A | 11/1998 | Rutledge |
| 5,841,133 A | 11/1998 | Omi |
| 5,841,423 A | 11/1998 | Carroll, Jr. et al. |
| 5,841,428 A | 11/1998 | Jaeger et al. |
| 5,844,673 A | 12/1998 | Ivers |
| 5,877,748 A | 3/1999 | Redlich |
| 5,879,327 A | 3/1999 | Moreau DeFarges et al. |
| 5,889,506 A | 3/1999 | Lopresti et al. |
| 5,912,661 A | 6/1999 | Siddiqui |
| 5,917,486 A | 6/1999 | Rylander |
| 5,919,159 A | 7/1999 | Lilley et al. |
| 5,936,613 A | 8/1999 | Jaeger et al. |
| 5,954,689 A | 9/1999 | Poulsen |
| 5,963,196 A | 10/1999 | Nishiumi et al. |
| 5,986,638 A | 11/1999 | Cheng |
| 6,017,273 A | 1/2000 | Pelkey |
| 6,031,222 A | 2/2000 | Carapelli |
| 6,078,311 A | 6/2000 | Pelkey |
| 6,078,876 A | 6/2000 | Rosenberg et al. |
| 6,097,499 A | 8/2000 | Casey et al. |
| 6,097,964 A | 8/2000 | Nuovo et al. |
| 6,104,379 A | 8/2000 | Petrich et al. |
| 6,183,364 B1 | 2/2001 | Trovato |
| 6,192,432 B1 | 2/2001 | Slivka et al. |
| 6,241,574 B1 | 6/2001 | Helbing |
| 6,259,433 B1 | 7/2001 | Meyers |
| 6,280,327 B1 | 8/2001 | Leifer et al. |
| 6,293,798 B1 | 8/2001 | Boyle et al. |
| 6,295,608 B1 | 9/2001 | Parkes et al. |
| 6,300,038 B1 | 10/2001 | Shimazu et al. |
| 6,349,301 B1 | 2/2002 | Mitchell et al. |
| 6,418,329 B1 | 7/2002 | Furuya |
| 6,546,390 B1 | 4/2003 | Pollack et al. |
| 6,633,224 B1 | 10/2003 | Hishida et al. |
| 6,760,751 B1 | 7/2004 | Hachiya et al. |
| 7,757,171 B1 | 7/2010 | Wong et al. |
| 8,992,322 B2 | 3/2015 | Endo et al. |
| 9,285,905 B1* | 3/2016 | Buuck .................... G06F 3/041 |
| 2001/0018354 A1 | 8/2001 | Pigni |
| 2001/0045978 A1 | 11/2001 | McConnell et al. |
| 2002/0072674 A1 | 6/2002 | Criton et al. |
| 2002/0151992 A1* | 10/2002 | Hoffberg et al. ............. 700/83 |
| 2002/0177471 A1* | 11/2002 | Kaaresoja ................ G08B 6/00 455/567 |
| 2003/0043206 A1 | 3/2003 | Duarte |
| 2003/0061400 A1* | 3/2003 | Eves ...................... A63F 13/02 719/321 |
| 2003/0068053 A1* | 4/2003 | Chu ........................ G06F 3/016 381/118 |
| 2003/0112269 A1 | 6/2003 | Lentz et al. |
| 2004/0031058 A1* | 2/2004 | Reisman ..................... 725/112 |
| 2004/0076444 A1 | 4/2004 | Badovinac et al. |
| 2004/0193393 A1 | 9/2004 | Keane |
| 2005/0187747 A1 | 8/2005 | Paxson et al. |
| 2005/0223237 A1* | 10/2005 | Barletta et al. ............... 713/186 |
| 2005/0229224 A1 | 10/2005 | Matsumoto et al. |
| 2006/0011042 A1* | 1/2006 | Brenner ................ G10H 1/0008 84/600 |
| 2006/0066569 A1 | 3/2006 | Eid et al. |
| 2007/0033259 A1* | 2/2007 | Wies ......................... G06F 3/01 709/206 |
| 2007/0202841 A1* | 8/2007 | Cruz-Hernandez ...... G08B 6/00 455/403 |
| 2008/0098331 A1 | 4/2008 | Novick et al. |
| 2008/0165081 A1 | 7/2008 | Lawther et al. |
| 2009/0049092 A1* | 2/2009 | Capio et al. ............. 707/104.1 |
| 2009/0079690 A1* | 3/2009 | Watson .................... A63F 13/02 345/156 |
| 2009/0096632 A1* | 4/2009 | Ullrich .................. H04N 9/8205 340/4.21 |
| 2009/0157753 A1* | 6/2009 | Lee .................... G06F 17/30053 |
| 2009/0293079 A1 | 11/2009 | McKee et al. |
| 2009/0327894 A1 | 12/2009 | Rakib et al. |
| 2010/0013653 A1* | 1/2010 | Birnbaum et al. ............. 340/669 |
| 2010/0153995 A1* | 6/2010 | Belz et al. ..................... 725/39 |
| 2011/0018697 A1* | 1/2011 | Birnbaum ................... 340/407.2 |
| 2011/0099017 A1 | 4/2011 | Ure |
| 2011/0102160 A1* | 5/2011 | Heubel et al. ............. 340/407.1 |
| 2011/0125788 A1 | 5/2011 | Joo et al. |
| 2011/0133910 A1* | 6/2011 | Alarcon ................ A61H 19/32 340/407.1 |
| 2011/0153768 A1 | 6/2011 | Carter et al. |
| 2012/0028577 A1* | 2/2012 | Rodriguez ......... H04N 21/44008 455/41.1 |
| 2012/0070085 A1* | 3/2012 | Arn ............................. 382/173 |
| 2012/0093216 A1 | 4/2012 | Black |
| 2012/0110621 A1 | 5/2012 | Gossweiler, III |
| 2013/0086178 A1 | 4/2013 | Osborne et al. |
| 2013/0227410 A1* | 8/2013 | Sridhara et al. ............. 715/702 |
| 2013/0229271 A1* | 9/2013 | Fantauzza .................. 340/407.1 |
| 2013/0307786 A1* | 11/2013 | Heubel ......................... 345/173 |
| 2013/0311881 A1 | 11/2013 | Birnbaum et al. |
| 2013/0326552 A1* | 12/2013 | Adams ............................ 725/14 |
| 2014/0167940 A1* | 6/2014 | Choi ........................ G08B 1/08 340/407.1 |
| 2014/0232657 A1* | 8/2014 | Aviles ...................... G06F 3/016 345/173 |
| 2014/0235347 A1* | 8/2014 | Zhang ...................... A63F 13/00 463/35 |
| 2014/0267906 A1* | 9/2014 | Mickelsen ......... H04N 21/4131 348/515 |
| 2015/0070150 A1* | 3/2015 | Levesque et al. ......... 340/407.1 |
| 2015/0097658 A1* | 4/2015 | Yagi et al. ................. 340/407.1 |
| 2015/0123774 A1* | 5/2015 | Ioffreda .................... H04R 3/00 340/407.1 |
| 2016/0085303 A1* | 3/2016 | Israr ...................... H04N 21/426 340/407.2 |
| 2016/0295302 A1* | 10/2016 | Fleureau ............... H04N 21/235 |
| 2017/0025153 A1* | 1/2017 | Svendsen ............. G11B 27/031 |

FOREIGN PATENT DOCUMENTS

| | | |
|---|---|---|
| CN | 102523493 | 6/2012 |
| DE | 197 57 385 | 7/1999 |
| EP | 0 085 518 B1 | 8/1989 |
| EP | 0 470 257 A1 | 2/1992 |
| EP | 0 358 989 B1 | 7/1994 |
| EP | 0 875 819 B1 | 10/2002 |
| EP | 2276240 | 1/2011 |
| EP | 2429183 | 3/2012 |
| GB | 2 237 160 A | 4/1991 |
| GB | 2 347 199 A | 8/2000 |
| WO | WO 96/16397 | 5/1996 |
| WO | WO 96/24398 | 8/1996 |
| WO | WO 96/32679 | 10/1996 |
| WO | WO 00/77689 A1 | 12/2000 |
| WO | WO 01/00630 A1 | 1/2001 |
| WO | WO 01/67297 A1 | 9/2001 |
| WO | WO 03/000319 A1 | 1/2003 |

(56) References Cited

FOREIGN PATENT DOCUMENTS

| WO | WO 2009/027110 | 3/2009 |
|---|---|---|
| WO | WO 2009/137329 | 11/2009 |
| WO | WO 2010/129892 | 11/2010 |

OTHER PUBLICATIONS

Adelstein, B. et al., Design and Implementation of a Force Reflecting Manipulandum for Manual Control Research, DSC—vol. 42, Advances in Robotics, ASME 1992, pp. 1-12.
Akamatsu et al., Multimodal Mouse: A Mouse-Type Device with Tactile and Force Display, Presence, vol. 3, No. 1 pp. 73-80, 1994.
ATIP98.059: Virtual Reality (VR) Development at SERI (Korea), Asian Technology Information Program (ATIP) Jul. 20, 1998, pp. 1-9.
Aukstakalnis, S. et al., The Art and Science of Virtual Reality Silicon Mirage, 1992, Peachpit Press, Inc., Berkeley, CA, pp. 129-180.
Baigrie, S. et al., Electric Control Loading-A Low Cost, High Performance Alternative, Proceedings, Nov. 6-8, 1990, pp. 247-254.
Bejczy, A., Sensors, Controls, and Man-Machine Interface for Advanced Teleoperation, Science, vol. 208, No. 4450, 1980, pp. 1327-1335.
Bejczy, A. et al., Kinesthetic Coupling Between Operator and Remote Manipulator, International Computer Technology Conference, The American Society of Mechanical Engineers, San Francisco, CA, Aug. 12-15, 1980, pp. 1-9.
Bejczy, A. et al., A Laboratory Breadboard System for Dual-Arm Teleoperation, SOAR '89 Workshop, JSC, Houston, Jul. 25-27, 1989.
Bejczy, A. et al., Universal Computer Control System (UCCS) for Space Telerobots, Jet Propulsion Laboratory, California Institute of Technology, Pasadena, CA, pp. 317-324.
Bjork, S. et al., An Alternative to Scroll Bars on Small Screens, Play: Applied Research on Art and Technology, Viktoria Institute, Box 620, SE-405 30 Gothenburg, Sweden, pp. 1-2.
Bouguila, L. et al., Effect of Coupling Haptics and Stereopsis on Depth Perception in Virtual Environment, Precision and Intelligence Laboratory, Tokyo Institute of Technology, 4259 Nagatsuta cho Midori ku Yokohama shi 226-8503-Japan.
Brooks, T. et al., Hand Controllers for Teleoperation: A State-of-the-Art Technology Survey and Evaluation, 1985, NASA Jet Propulsion Laboratory, California Institute of Technology, Pasadena, CA.
Burdea, G. et al., Distributed Virtual Force Feedback, IEEE Workshop on "Force Display in Virtual Environments and its Application to Robotic Teleoperation," May 2, 1993, Atlanta, GA.
Calder, B. et al., Design of a Force-Feedback Touch-Inducing Actuator for Teleoperator Robot Control, Submitted to the Department of Mechanical Engineering and Electrical Engineering in partial Fulfillment of the requirements of the degree of Bachelors of Science in Mechanical Engineering and Bachelor of Science in Electrical Engineering at the Massachusetts Institute of Technology, May 1983.
Caldwell, D. et al., Enhanced Tactile Feedback (Tele-Taction) using a Multi-Functional Sensory System, Dept. of Electronic Eng., University of Salford, Salford, M5 4WT, UK, 1993.
Cyberman Technical Specification, Logitech Cyberman SWIFT Supplement, Revision 1.0, Apr. 5, 1994, pp. 1-29.
Eberhardt, S. et al., OMAR-A Haptic Display for Speech Perception by Deaf and Deaf-Blind Individuals, IEEE Virtual Reality Annual International Symposium, Sep. 18-22, 1993, Seattle Washington.
Eberhardt, S. et al., Inducing Dynamic Haptic Perception by the Hand: System Description and Some Results, Dynamic Systems and Control, 1994, vol. 1, presented at 1994 International Mechanical Engineering Congress and Exposition, Chicago Illinois, Nov. 6-11, 1994.
Fukumoto, M. et al., Active Click: Tactile Feedback for Touch Panels, NTT DoCoMo Multimedia Labs, Japan.

Gobel, M. et al., Tactile Feedback Applied to Computer Mice, International Journal of Human-Computer Interaction, vol. 7, No. 1, pp. 1-24, 1995.
Gotow, J. et al., Controlled Impedance Test Apparatus for Studying Human Interpretation of Kinesthetic Feedback, The Robotics Institute and Department of Mechanical Engineering, Carnegie Mellon University, Pittsburgh, PA 15213, pp. 332-337, 1984.
Hansen, W., Enhancing Documents with Embedded Programs: How Ness extends Insets in the Andrew Toolkit, 1990, Information Technology Center, Carnegie Mellon University, Pittsburgh, PA 15213.
Hasser, C. et al., Tactile Feedback with Adaptive Controller for a Force-Reflecting Haptic Display Part 1: Design, 1996, Armstrong Laboratory, Human Systems Center, Air Force Materiel Command, Wright-Patterson AFB OH 45433.
Hasser, C. et al., Tactile Feedback for a Force-Reflecting Haptic Display, Thesis Submitted to the School of Engineering of the University of Daytona, Dayton OH, Dec. 1995.
Hasser, C., Force-Reflecting Anthropomorphic Hand Masters, Crew Systems Directorate Biodynamics and Biocommunications Division, Wright-Patterson AFB OH 45433-7901, Jul. 1995, Interim Report for the Period Jun. 1991-Jul. 1995.
Hinckley, K. et al., Haptic Issues for Virtual Manipulation, A Dissertation presented to the Faculty of the School of Engineering and Applied Science at the University of Virginia, in Partial Fulfillment of the Requirement for the Degree Doctor of Philosophy (Computer Science), Dec. 1996.
Howe, R., A Force-Reflecting Teleoperated Hand System for the Study of Tactile Sensing in Precision Manipulation, Proceedings of the 1992 IEEE Conference in Robotics and Automation, Nice, France—May 1992.
Iwata, H., Pen-Based Haptic Virtual Environment, Institute of Engineering Mechanics, University of Tsukuba, Japan, 1993.
Jacobsen, S. et al., High Performance, Dextrous Telerobotic Manipulator with Force Reflection, Intervention/ROV '91, Conference & Exposition, May 21-23, 1991, Hollywood, FL.
Johnson, A., Shape-Memory Alloy Tactical Feedback Actuator, Phase I-Final Report, Air Force SABIR Contract F33-88-C-0541, Armstrong Aerospace Medical Research Laboratory, Human Systems Division, Air Force Systems Command, Wright-Patterson Air Force Base, OH 45433.
Jones, L. et al., A Perceptual Analysis of Stiffness, Experimental Brain Research, 1990, vol. 79, pp. 150-156.
Kaczmarek, K. et al., Tactile Displays, Virtual Environment Technologies, pp. 349-414, 1995.
Kelley, A. et al., MagicMouse: Tactile and Kinesthetic Feedback in the Human-Computer Interface using an Electromagnetically Actuated Input/Output Device, Department of Electrical Engineering, University of British Canada, Oct. 19, 1993.
Lake, S.L., Cyberman from Logitech, web site at http://www.ibiblio.org/GameBytes/issue21/greviews/cyberman/html, as available via the Internet and printed May 29, 2002.
MacLean, K., Designing with Haptic Feedback, Interval Research Corporation, 1801 Page Mill Road, Palo Alto, CA 94304, 2000.
Mine, M., Isaac: A Virtual Environment Tool for the Interactive Construction of Virtual Worlds, Department of Computer Science, University of North Carolina Chapel Hill, 1995.
Picinbono, G. et al., Extrapolation: A Solution for Force Feedback, Virtual Reality and Prototyping, Jun. 1999, Laval, France.
Wloka, M., Interacting with Virtual Reality, Science and Technology Center for Computer Graphics and Scientific Visualization, Brown University Site, Department of Computer Science, 1995.
eRENA, Pushing Mixed Reality Boundaries, Deliverable 7b.1, Final, Version 1.0.
Real Time Graphics, The Newsletter of Virtual Environment Technologies and Markets, Aug. 1998, vol. 7, No. 2.
1998 IEEE International Conference on Robotics and Automation, May 16-20, 1998, Lueven, Belgium.
European Patent Office, Communication pursuant to Article 94(3) EPC, Application No. 14160149 dated Jan. 27, 2017.
Chinese Patent Office, Notification of First Office Action, Application No. 201410097449 dated Jan. 26, 2017.

(56) References Cited

OTHER PUBLICATIONS

European Patent Office, European Search Report and Written Opinion, European Application No. 14160149.2 dated Oct. 10, 2014.

* cited by examiner

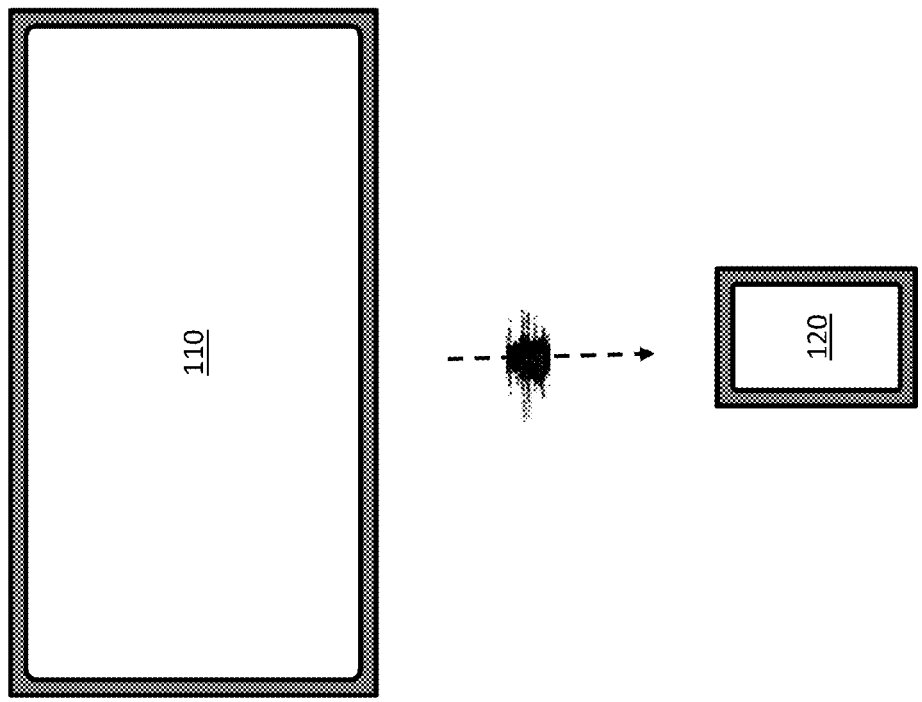

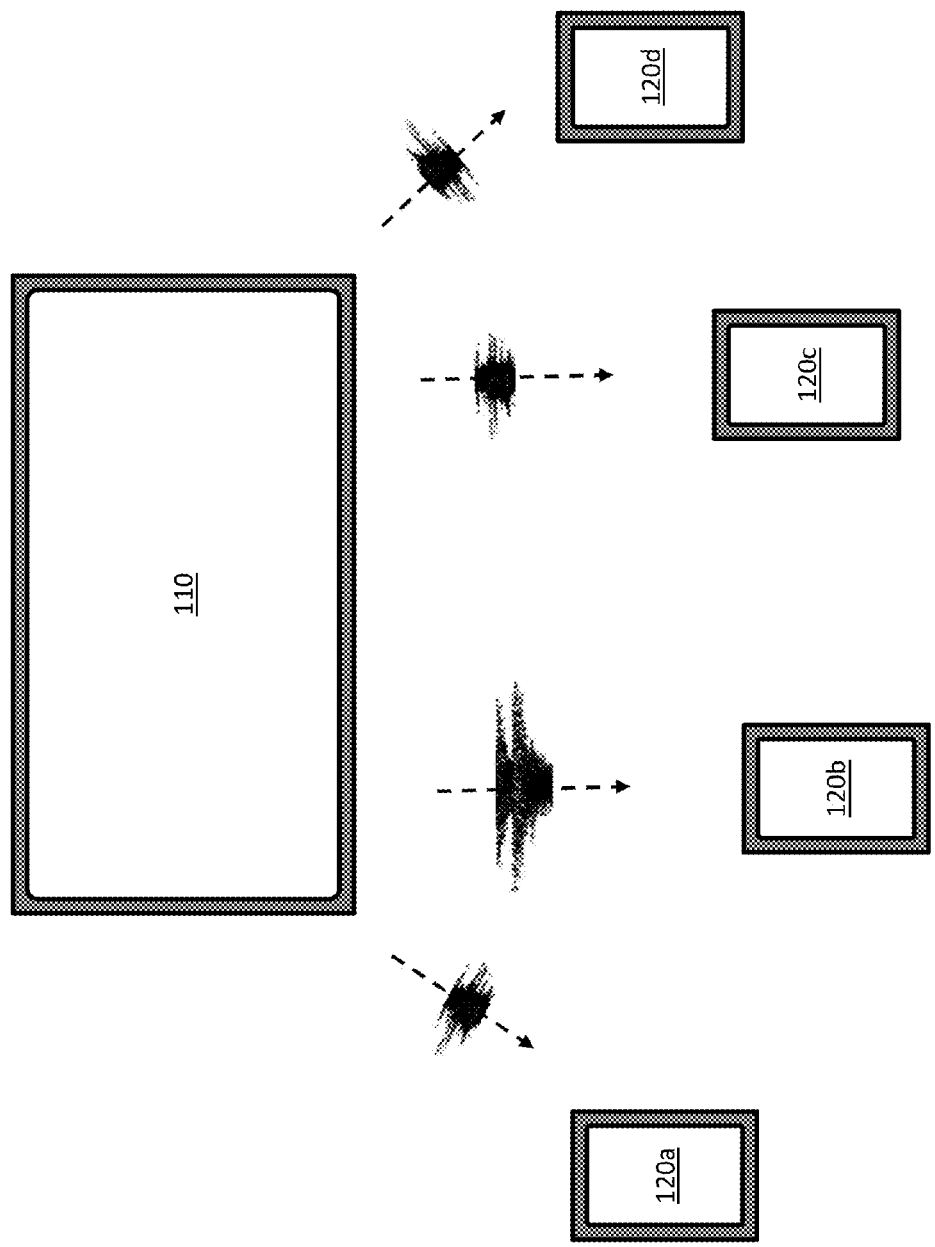

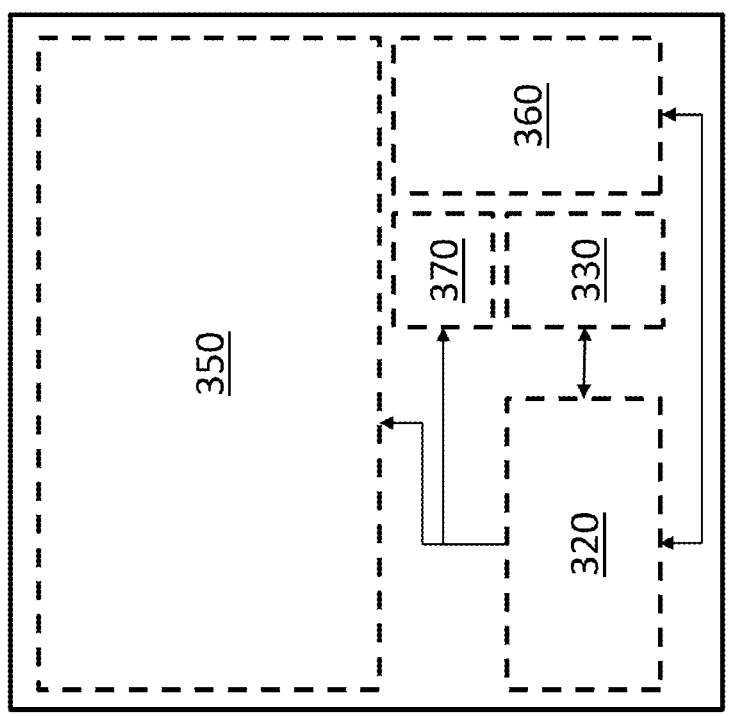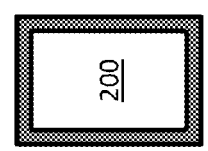
Figure 3

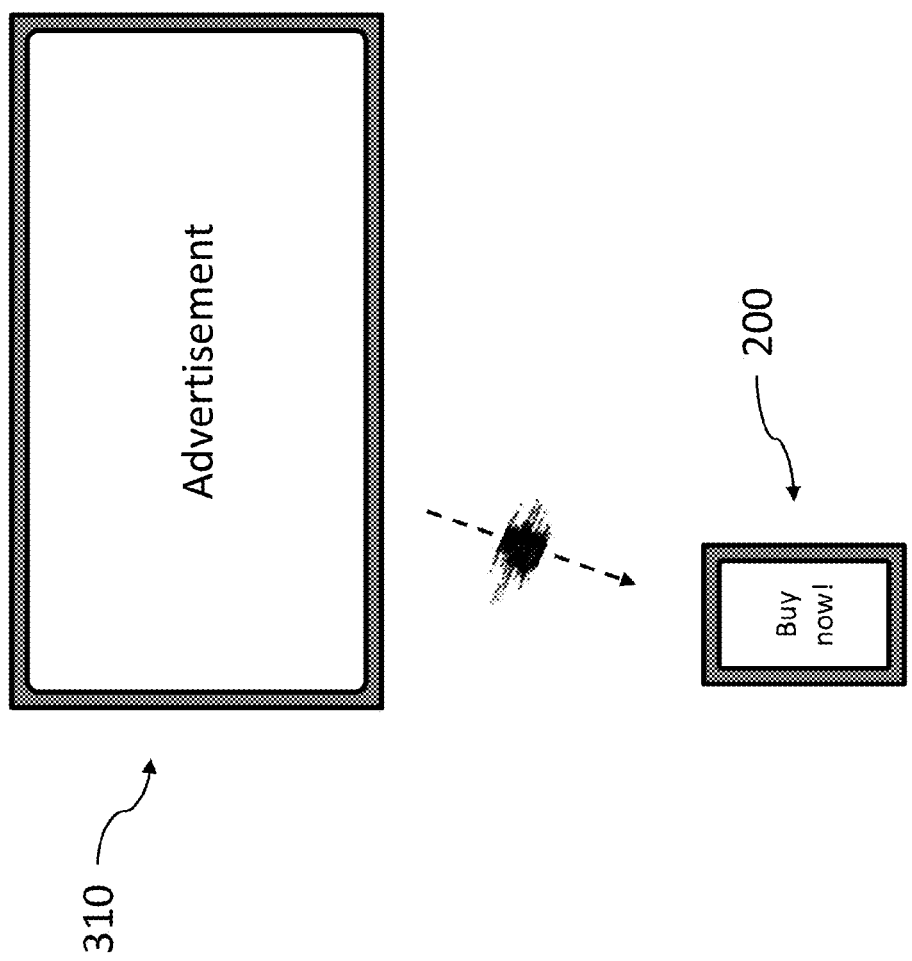

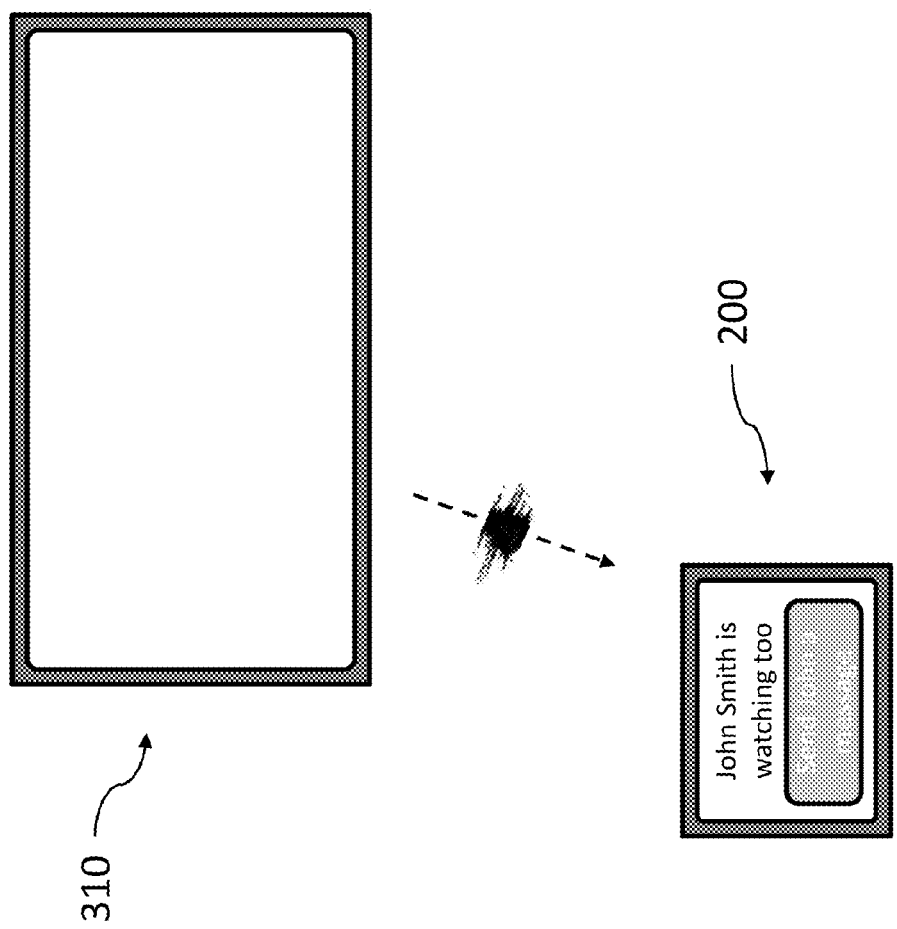

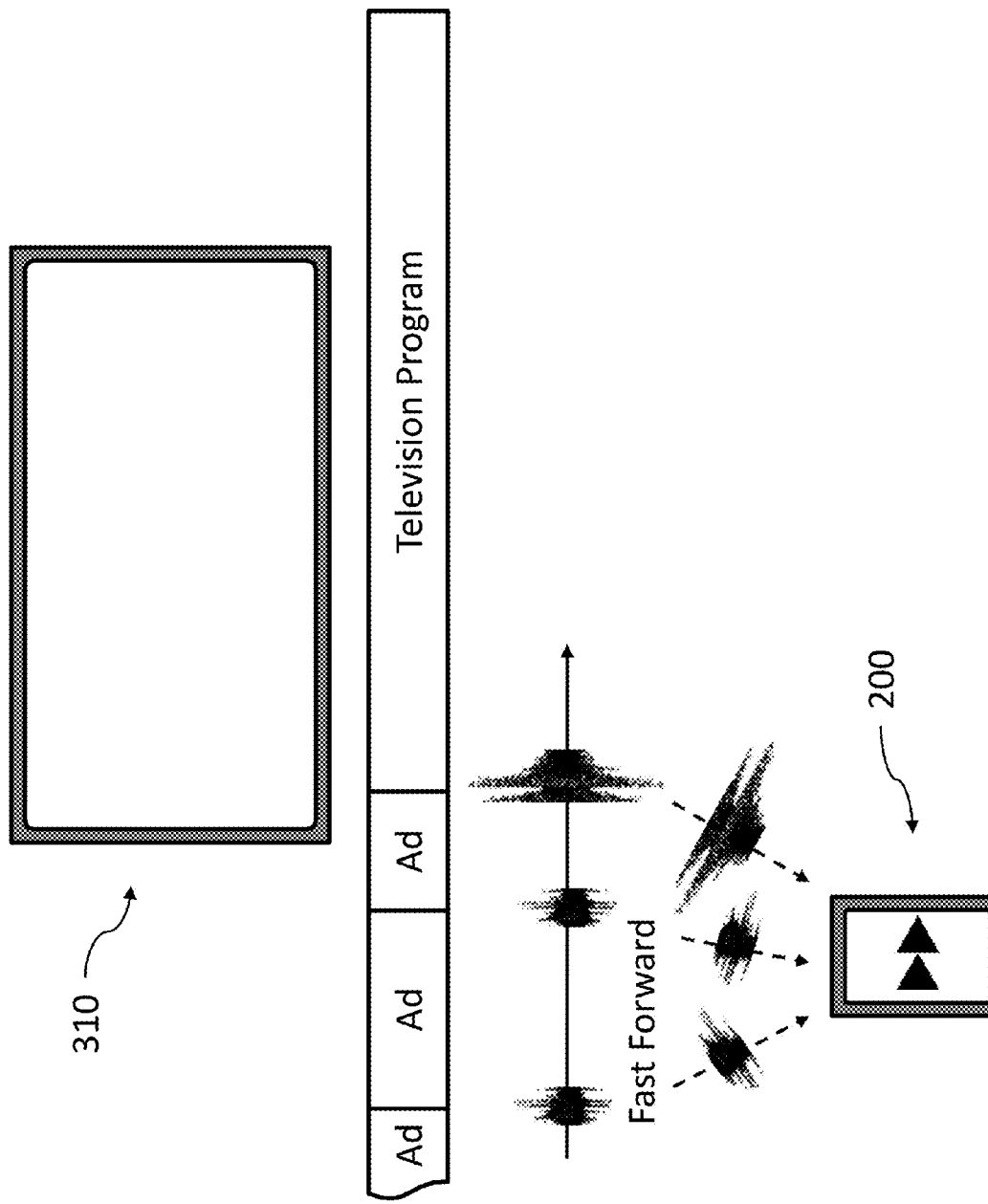

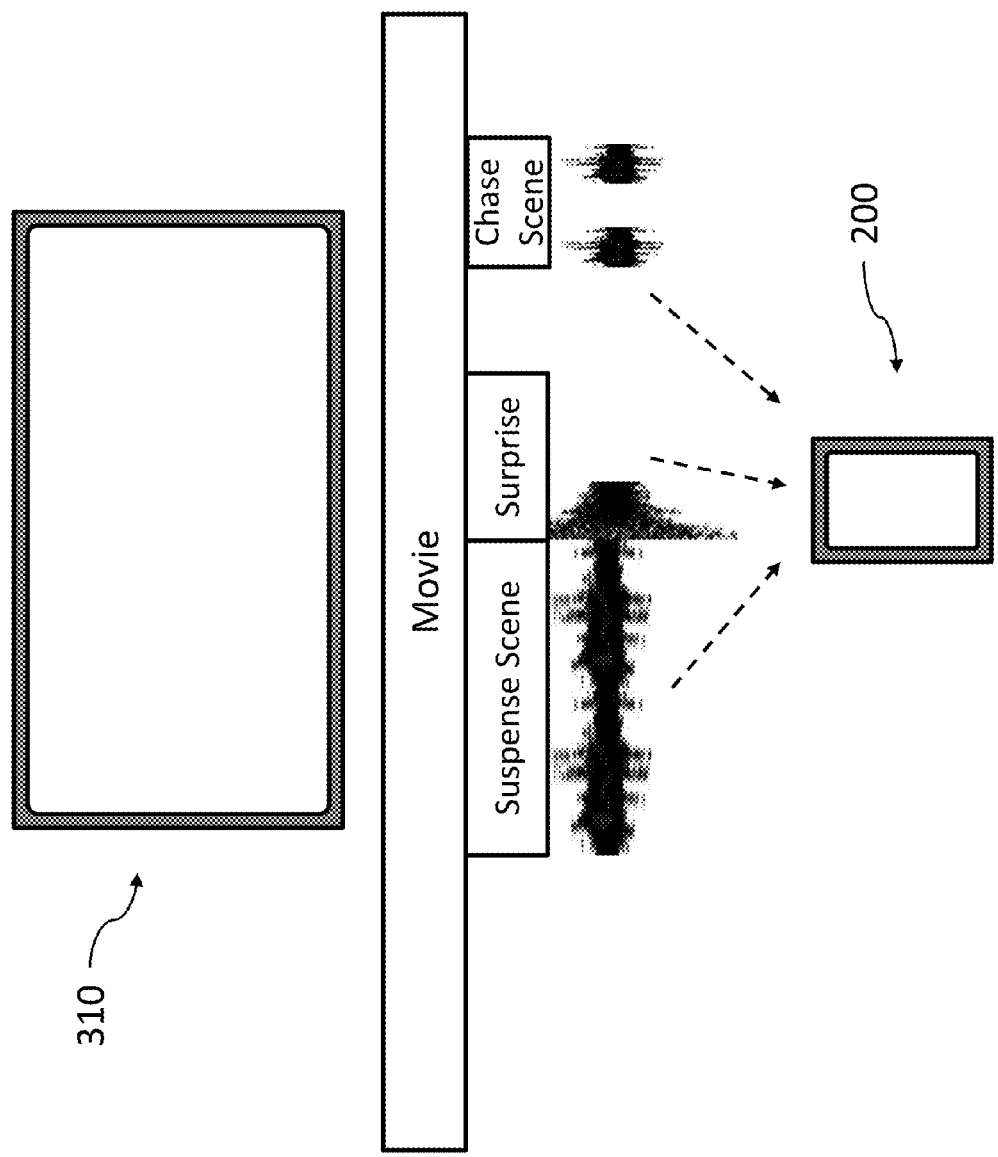

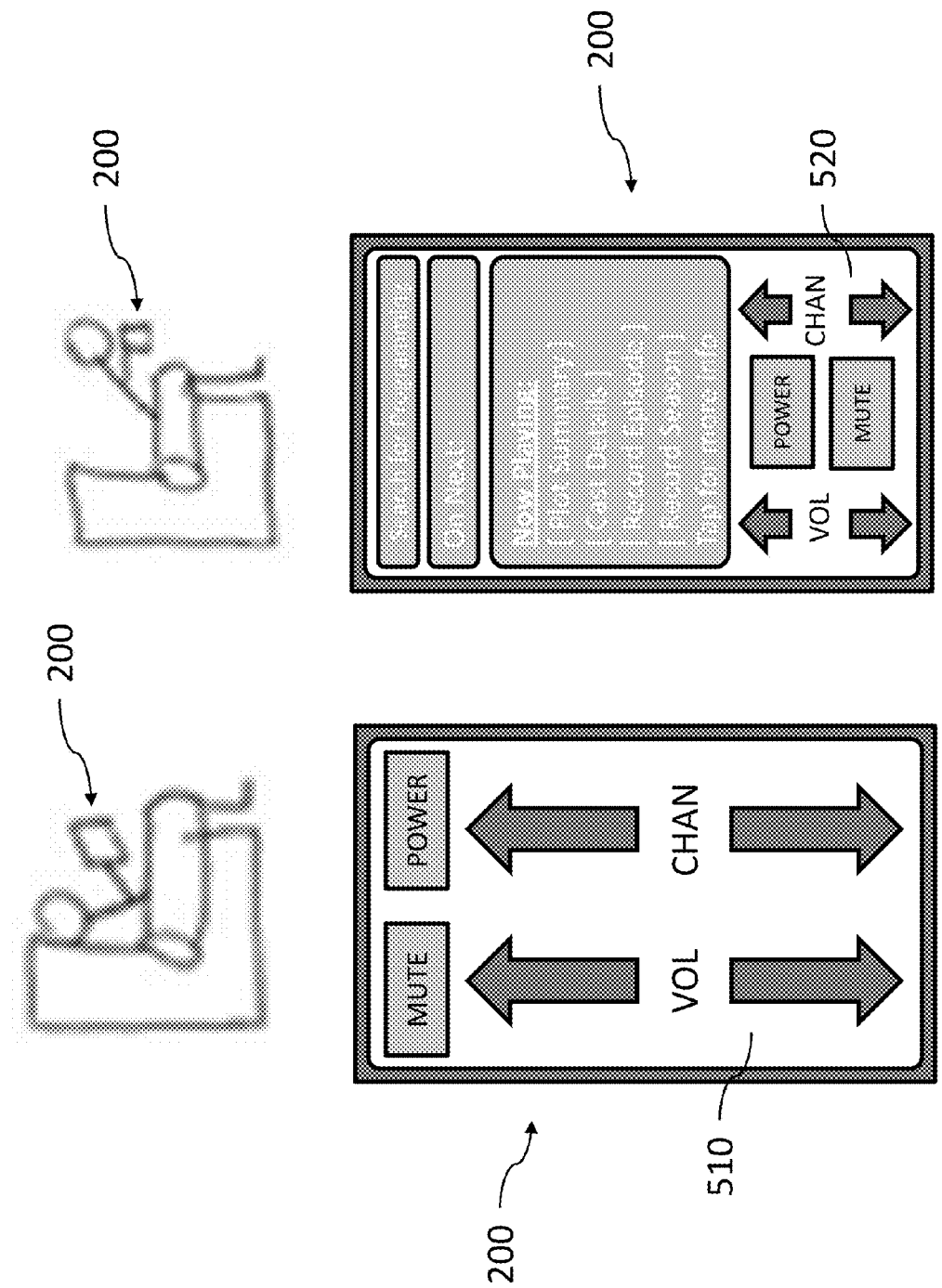

SYSTEMS AND METHODS FOR ENHANCED TELEVISION INTERACTION

FIELD

The present disclosure relates generally to haptic feedback and more specifically relates to systems and methods for enhanced television interaction.

BACKGROUND

Conventional televisions allow users to watch various content features, such as broadcast, cable, or satellite programming, pre-recorded shows and movies, and play video games. Such content may be provided to a television and displayed to one or more viewers or participants. Frequently, such programming includes other content that is associated with, or supersedes, the programming the viewer desires to watch, such as advertisements or emergency broadcast messages, which may cause the user to lose focus on the television or other display device. Or the user, while enjoying a particular program, may not feel fully immersed within the program.

SUMMARY

Embodiments according to the present disclosure provide systems and methods for enhanced television interaction. For example, one disclosed embodiment comprises a method having the steps of receiving notification information, the notification information indicating an event associated with video content displayed by a television device; determining a haptic effect associated with the notification information; and generating and transmitting a haptic signal to a haptic output device, the haptic signal configured to cause the haptic output device to output the haptic effect. In another embodiment, a computer-readable medium comprises program code for causing a processor to carry out such a method.

These illustrative embodiments are mentioned not to limit or define the invention, but rather to provide examples to aid understanding thereof. Illustrative embodiments are discussed in the Detailed Description, which provides further description of the invention. Advantages offered by various embodiments of this invention may be further understood by examining this specification.

BRIEF DESCRIPTION OF THE DRAWINGS

The accompanying drawings, which are incorporated into and constitute a part of this specification, illustrate one or more examples of embodiments and, together with the description of example embodiments, serve to explain the principles and implementations of the embodiments.

FIGS. 1A-C show systems for enhanced television interaction according to embodiments;

FIG. 3 shows a television device for enhanced television interaction according to one embodiment;

FIGS. 4A-D and 5 show systems for enhanced television interaction according to embodiments.

DETAILED DESCRIPTION

Example embodiments are described herein in the context of systems and methods for enhanced television interaction. Those of ordinary skill in the art will realize that the following description is illustrative only and is not intended to be in any way limiting. Other embodiments will readily suggest themselves to such skilled persons having the benefit of this disclosure. Reference will now be made in detail to implementations of example embodiments as illustrated in the accompanying drawings. The same reference indicators will be used throughout the drawings and the following description to refer to the same or like items.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Illustrative Systems for Enhanced Television Interaction

Referring now to FIG. 1A, FIG. 1A shows an illustrative system for enhanced television interaction according to one embodiment. FIG. 1A shows a "smart" television 110 and a handheld tablet computing device 120. A user is watching a program on the television 110 and uses the tablet device 120 as a remote control to control the television, such as to change channels, change volume, find program information, record and playback content (such as on a digital video recorder), etc. After finding a television program to watch, the user changes the channel and begins to watch the program. A bit later, the television program is interrupted by commercials and the user changes her attention to her tablet computer, where she begins to browse the Internet. At the same time, the smart television 110 has been monitoring the stream of content received over the television channel and determines that a commercial interruption has occurred, and generates and transmits a haptic effect to the user's device to indicate that a commercial has started. At this time, the user takes her tablet into the kitchen to grab a drink and type a quick email.

As the smart television 110 continues to monitor the television channel, it transmits signals to the user's device to cause haptic effects to be output each time a commercial ends. After a few minutes, the television determines that the program the user is watching is resuming. The smart television again transmits a haptic signal to the user's tablet, which causes the tablet to output a strong haptic effect to the user to indicate that the television program is about to re-start, at which time, the user returns saves her email to finish later and returns to continue watching television.

Figure 1B:
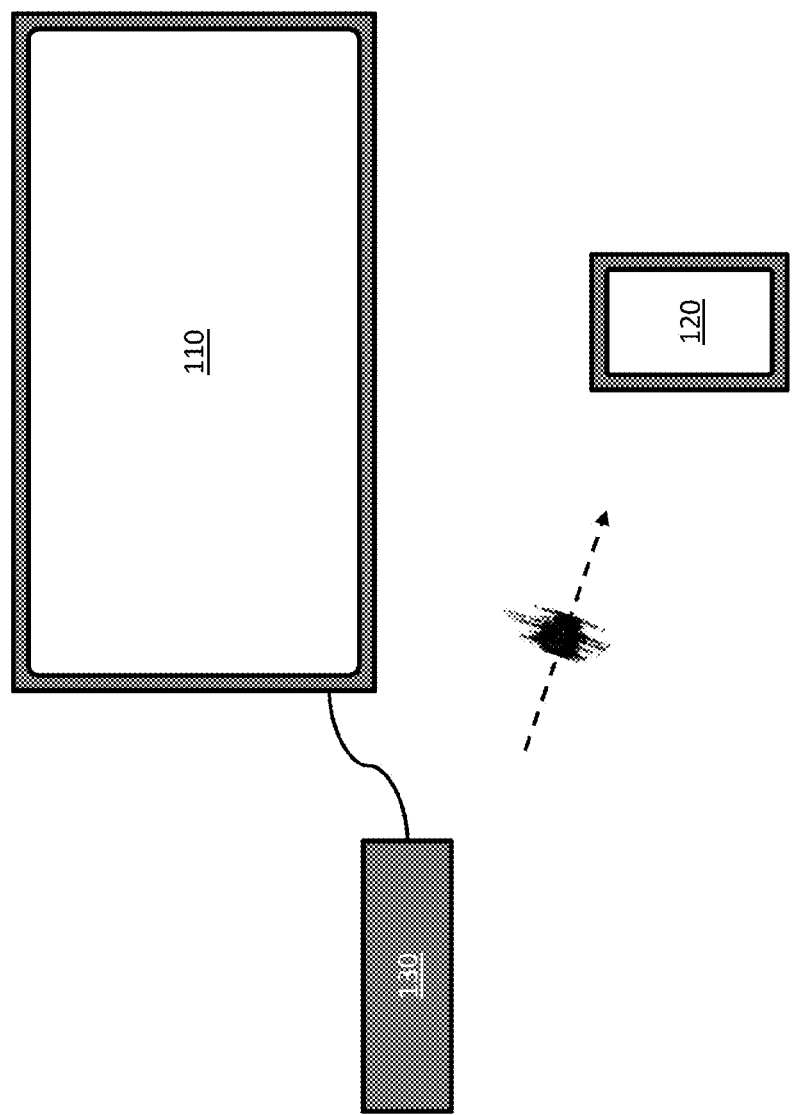

Somewhat later, the user elects to watch a program that she has previously recorded on a digital video recorder (DVR). She uses her tablet to select the program and to begin its replay. After a time, the recording begins to playback commercials that aired during the broadcast of the recorded program. The user selects a fast-forward function on her tablet to fast forward through the commercials. As she fast forwards, the television monitors the content streaming from the DVR and, as each commercial ends, the smart TV transmits a haptic message to the tablet to output a low intensity haptic effect to indicate that a commercial has finished. Or as shown in FIG. 1B, in some cases the DVR (or both) may monitor the content to provide haptic signals to the tablet. Thus, as the user fast forwards through multiple commercials, she feels haptic effects after each commercial concludes. When the smart television determines that the last commercial has ended and the television program is resuming, the smart television transmits a high intensity haptic signal to the tablet, which outputs a haptic effect to indicate that the television program is resuming. The user then presses a "play" function to return playback to normal speed and resumes watching the television program. These embodiments allow the user to fully control her own television experience, but provide helpful tactile cues to allow her to divide her attention between other tasks. Such functionality can be useful in a wide variety of contexts and additional events may be detected and used to enhance the user's enjoyment of such content.

Referring now to FIG. 1C, another illustrative embodiment is shown in which multiple devices are in use by different users all watching the same television. Each of the devices 120 establish communications with the television and are able to receive information from the television, such as the haptic effects discussed above to indicate that a commercial break is ending. However, in the system shown in FIG. 1C, while four devices 120a-d are interacting with the television, only 1 device 120b is able to control the television. Thus, the user of device 120b may receive additional, or stronger, effects from the television, such as to emphasize certain events to prompt user action, rather than to simply provide subtle information to passive viewers having devices 120a, c, d.

These illustrative examples are given to introduce the reader to the general subject matter discussed herein and the disclosure is not limited to these examples. The following sections describe various additional non-limiting embodiments and examples of systems and methods for enhanced television interaction.

Figure 2:
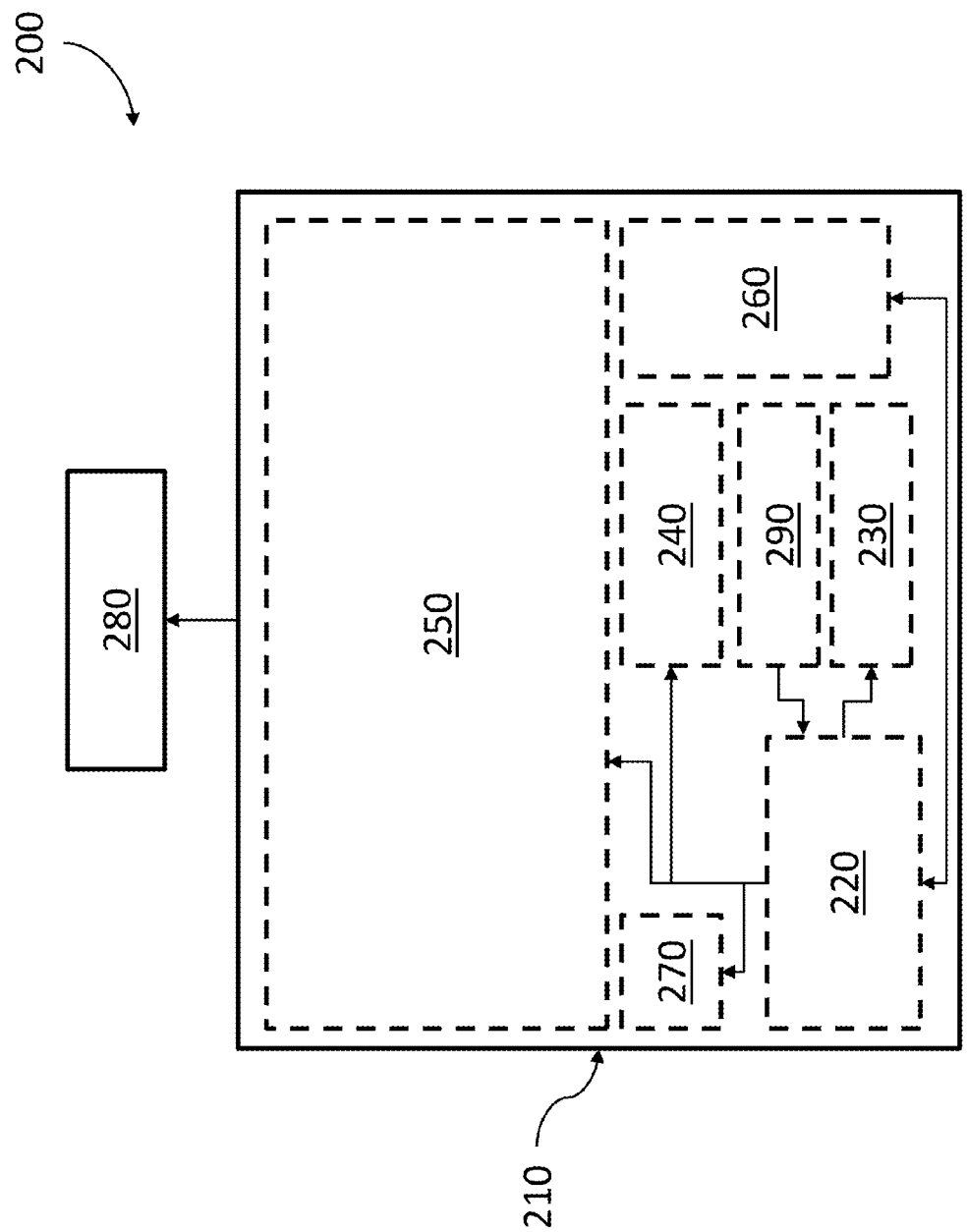
FIG. 2 shows a device for enhanced television interaction according to one embodiment.

Referring now to FIG. 2, FIG. 2 shows a system for enhanced television interaction according to one embodiment. In the embodiment shown in FIG. 2, the system 200 comprises a housing 210, a processor 220, a memory 230, a touch-sensitive display 250, a haptic output device 240, a communication interface 260, a speaker 270, and a sensor 290. In addition, the system 200 is in communication with haptic output device 280, which may be optionally coupled to or incorporated into some embodiments. The processor 220 is in communication with the memory 230 and, in this embodiment, both the processor 220 and the memory 230 are disposed within the housing 210. The touch-sensitive display 250, which comprises or is in communication with a touch-sensitive surface, is partially disposed within the housing 210 such that at least a portion of the touch-sensitive display 250 is exposed to a user of the system 200. In some embodiments, the touch-sensitive display 250 may not be disposed within the housing 210. For example, the system 200 may be connected to or otherwise in communication with a touch-sensitive display 250 disposed within a separate housing. In some embodiments, the housing 210 may comprise two housings that may be slidably coupled to each other, pivotably coupled to each other or releasably coupled to each other. In still other embodiments, the system 200 may comprise or be in communication with a display and may comprise or be in communication with other user input devices, such as a mouse, a keyboard, buttons, knobs, slider controls, switches, wheels, rollers, joysticks, other manipulanda, or a combination thereof.

In some embodiments, one or more touch-sensitive surfaces may be included on or disposed within one or more sides of the system 200. For example, in one embodiment, a touch-sensitive surface is disposed within or comprises a rear surface of the system 200. In another embodiment, a first touch-sensitive surface is disposed within or comprises a rear surface of the system 200 and a second touch-sensitive surface is disposed within or comprises a side surface of the system 200. In some embodiments, the system may comprise two or more housing components, such as in a clamshell arrangement or in a slideable arrangement. For example, one embodiment comprises a system having a clamshell configuration with a touch-sensitive display disposed in each of the portions of the clamshell. Furthermore, in embodiments where the system 200 comprises at least one touch-sensitive surface on one or more sides of the system 200 or in embodiments where the system 200 is in communication with an external touch-sensitive surface, the display 250 may or may not comprise a touch-sensitive surface. In some embodiments, one or more touch-sensitive surfaces may have a flexible touch-sensitive surface. In other embodiments, one or more touch-sensitive surfaces may be rigid. In various embodiments, the system 200 may comprise both flexible and rigid touch-sensitive surfaces.

In the embodiment shown in FIG. 2, the touch-sensitive display 250 is in communication with the processor 220 and is configured to provide signals to the processor 220 or the memory 230 and to receive signals from the processor 220 or memory 230. The memory 230 is configured to store program code or data, or both, for use by the processor 220, which is configured to execute program code stored in memory 230 and to transmit signals to and receive signals from the touch-sensitive display 250. In the embodiment shown in FIG. 2, the processor 220 is also in communication with the communication interface 260 and is configured to receive signals from the communication interface 260 and to output signals to the communication interface 260 to communicate with other components or devices such as one or more remote computers or servers.

In addition, the processor 220 is in communication with haptic output device 240 and haptic output device 280, and is further configured to output signals to cause haptic output device 240 or haptic output device 280, or both, to output one or more haptic effects. Furthermore, the processor 220 is in communication with speaker 270 and is configured to output signals to cause speaker 270 to output sounds. In various embodiments, the system 200 may comprise or be in communication with fewer or additional components or devices. For example, other user input devices such as a mouse or a keyboard, or both, or an additional touch-sensitive device may be comprised within the system 200 or be in communication with the system 200. As another example, system 200 may comprise and/or be in communication with one or more accelerometers, gyroscopes, digital compasses, and/or other sensors.

The housing 210 of the system 200 shown in FIG. 2 provides protection for at least some of the components system 200. For example, the housing 210 may be a plastic casing that protects the processor 220 and memory 230 from foreign articles such as rain. In some embodiments, the housing 210 protects the components in the housing 210 from damage if the system 200 is dropped by a user. The housing 210 can be made of any suitable material including but not limited to plastics, rubbers, or metals. Various embodiments may comprise different types of housings or a plurality of housings. For example, in some embodiments, the system 200 may be a portable device, handheld device, toy, gaming console, handheld video game system, gamepad, game controller, desktop computer, e-book reader, portable multifunction device such as a cell phone, smartphone, personal digital assistant (PDA), laptop, tablet computer, digital music player, etc. In other embodiments, the system 200 may be embedded in another device such as a wrist watch, other jewelry, gloves, etc. Thus, in embodiments, the system 200 is wearable.

In the embodiment shown in FIG. 2, haptic output devices 240 and 280 are in communication with the processor 220 and are configured to provide one or more haptic effects. For example, in one embodiment, when an actuation signal is provided to haptic output device 240, haptic output device 280, or both, by the processor 220, the respective haptic output device(s) 240, 280 outputs a haptic effect based on the actuation signal. For example, in the embodiment shown, the processor 220 is configured to transmit a haptic output signal to haptic output device 240 comprising an analog drive signal. In some embodiments, the processor 220 is configured to transmit a high-level command to haptic output device 280, wherein the command includes a command identifier and zero or more parameters to be used to generate an appropriate drive signal to cause the haptic output device 280 to output the haptic effect. In other embodiments, different signals and different signal types may be sent to each of one or more haptic output devices. For example, in some embodiments, a processor may transmit low-level drive signals to drive a haptic output device to output a haptic effect. Such a drive signal may be amplified by an amplifier or may be converted from a digital to an analog signal, or from an analog to a digital signal using suitable processors or circuitry to accommodate the particular haptic output device being driven.

In order to generate vibration effects, many devices utilize some type of actuator or haptic output device. Known haptic output devices used for this purpose include an electromagnetic actuator such as an Eccentric Rotating Mass ("ERM") in which an eccentric mass is moved by a motor, a Linear Resonant Actuator ("LRA") in which a mass attached to a spring is driven back and forth, or a "smart material" such as piezoelectric, electro-active polymers or shape memory alloys. Haptic output devices also broadly include other devices such as those that use electrostatic friction (ESF), ultrasonic surface friction (USF), or those that induce acoustic radiation pressure with an ultrasonic haptic transducer, or those that use a haptic substrate and a flexible or deformable surface, or those that provide projected haptic output such as a puff of air using an air jet, and so on.

In other embodiments, deformation of one or more components can be used to produce a haptic effect. For example, one or more haptic effects may be output to change the shape of a surface or a coefficient of friction of a surface. In an embodiment, one or more haptic effects are produced by creating electrostatic forces and/or ultrasonic forces that are used to change friction on a surface. In other embodiments, an array of transparent deforming elements may be used to produce a haptic effect, such as one or more areas comprising a smartgel. Haptic output devices also broadly include non-mechanical or non-vibratory devices such as those that use electrostatic friction (ESF), ultrasonic surface friction (USF), or those that induce acoustic radiation pressure with an ultrasonic haptic transducer, or those that use a haptic substrate and a flexible or deformable surface, or those that provide projected haptic output such as a puff of air using an air jet, and so on. In some embodiments comprising haptic output devices 240, 280 that are capable of generating frictional or deformation effects, the haptic output devices 240 or 280 may be overlaid on the touch-sensitive display or otherwise coupled to the touch-sensitive display 250 such that the frictional or deformation effects may be applied to a touch-sensitive surface that is configured to be touched by a user. In some embodiments, other portions of the system may provide such forces, such as portions of the housing that may be contacted by the user or in a separate touch-separate input device coupled to the system. Co-pending U.S. patent application Ser. No. 13/092,484, filed Apr. 22, 2011, entitled "Systems and Methods for Providing Haptic Effects," the entirety of which is hereby incorporated by reference, describes ways that one or more haptic effects can be produced and describes various haptic output devices.

It will be recognized that any type of input synthesis method may be used to generate the interaction parameter from one or more haptic effect signals including, but not limited to, the method of synthesis examples listed in TABLE 1 below.

TABLE 1

METHODS OF SYNTHESIS

| Synthesis Method | Description |
| --- | --- |
| Additive synthesis | combining inputs, typically of varying amplitudes |
| Subtractive synthesis | filtering of complex signals or multiple signal inputs |
| Frequency modulation synthesis | modulating a carrier wave signal with one or more operators |
| Sampling | using recorded inputs as input sources subject to modification |
| Composite synthesis | using artificial and sampled inputs to establish a resultant "new" input |
| Phase distortion | altering the speed of waveforms stored in wavetables during playback |
| Waveshaping | intentional distortion of a signal to produce a modified result |
| Resynthesis | modification of digitally sampled inputs before playback |
| Granular synthesis | combining of several small input segments into a new input |
| Linear predictive coding | similar technique as used for speech synthesis |
| Direct digital synthesis | computer modification of generated waveforms |
| Wave sequencing | linear combinations of several small segments to create a new input |
| Vector synthesis | technique for fading between any number of different input sources |
| Physical modeling | mathematical equations of the physical characteristics of virtual motion |

In FIG. 2, the communication interface 260 is in communication with the processor 220 and provides wired or wireless communications from the system 200 to other components or other devices. For example, the communication interface 260 may provide wireless communications between the system 200 and a communications network. In some embodiments, the communication interface 260 may provide communications to one or more other devices, such as another system 200 and/or one or more other devices, such as a television, DVR, or other audio-visual component. The communication interface 260 can be any component or collection of components that enables the system 200 to communicate with another component, device, or network. For example, the communication interface 260 may comprise a PCI communication adapter, a USB network adapter, or an Ethernet adapter. The communication interface 260 may communicate using wireless Ethernet, including 802.11 a, g, b, or n standards. In one embodiment, the communication interface 260 can communicate using Radio Frequency (RF), Bluetooth, CDMA, TDMA, FDMA, GSM, Wi-Fi, satellite, or other cellular or wireless technology. In other embodiments, the communication interface 260 may communicate through a wired connection and may be in communication with one or more networks, such as Ethernet, token ring, USB, FireWire 1394, fiber optic, etc. In some embodiments, system 200 comprises a single communication interface 260. In other embodiments, system 200 comprises two, three, four, or more communication interfaces.

The embodiment shown in FIG. 2 also comprises a sensor 290, though some embodiments may comprise no sensors or a plurality of sensors. Additionally, the sensor 290 may be housed in the same component as the other components of the computing system or in a separate component. For example, in some embodiments, the processor, memory, and sensor are all comprised in a user device 200. On the other hand, in some embodiments, the sensor is placed in component separate from another component that houses the memory and/or processor. For instance, a wearable sensor may be in communication with the processor and memory or a user device or wearable device via a wired or wireless connection. The sensor 290 is configured to sense an environmental factor, which can represent at least one of an ambient condition or a force applied to the sensor. Sensor 290 can comprise any number or type of sensing components. As an example, sensor 290 may comprise an accelerometer or gyroscope. A non-limiting list of examples of sensors and environmental factors is provided below:

TABLE 1

Exemplary Sensors and Factors

| Sensor | Environmental Factor Sensed |
| --- | --- |
| Accelerometer | Force in one, two, or three directions |
| Altimeter | Altitude |
| Thermometer | Ambient temperature; user body temperature |
| Heart rate monitor | Heart rate of device user |
| Skin resistance monitor | Skin resistance of device user |
| Oxygen sensor | Oxygen use of device user |
| Audio sensor/ microphone | Ambient audio and/or audio generated by device user |
| Photosensor | Ambient light |
| IR/Photosensor | User eye movement, position, body temperature |
| Hygrometer | Relative humidity |
| Speedometer | Velocity |
| Pedometer/odometer | Distance traveled |
| chronometer | time of day, date |

Environmental factors can include any of the environmental factors noted above or any other quantities representative of an ambient condition or force applied to or directed to the user device 200. Additionally, environmental factors may be evaluated directly from sensor data or may be processed by the device to derive other environmental factors. For example, acceleration data may be used to determine a device orientation, velocity and/or a pattern of motion. As a further example, physiological data such as heart rate, skin resistance, and other factors can be used to determine a physiological state of a device user (e.g., awake, stressed, asleep, REM sleep, etc.).

Referring now to FIG. 3, FIG. 3 shows a system for enhanced television interaction according to one embodiment. In the embodiment shown in FIG. 3, the television is configured to communicate with device 200 using the communications interface 340, such as to receive commands from the device 200 and to transmit notification signals to the device 200. The system of FIG. 3 includes a device 200 according to the embodiment shown in FIG. 2 and a television 310. In this embodiment, the television comprises a processor 320, a memory 330, a communications interface 340, a speaker 350, and a display screen 360. In some embodiments, the television 310 may also comprise, or be in communication with, one or more haptic output devices. The processor 320 is configured to execute software stored in memory 330, to receive content from the communications interface 340, decode the content and transmit display signals to the display 360 and to transmit audio signals to the speaker 350. In addition, the processor 320 is configured to monitor content to identify one or more events associated with the content and to generate notifications and transmit notification signals using communication interface 340.

Communications interface 340 comprises at least one communications device, such as a television receiver, an HDMI receiver, a network connection (e.g. Ethernet, 802.11), or other communications interfaces, such as those discussed above with respect to the handheld device 200. In some embodiments, communications interface 340 may comprise a plurality of communications devices. For example, in one embodiment, communications interface comprises an HDMI interface and an 802.11 interface. In one such an embodiment, the television 310 is configured to receive content from the HDMI interface and to transmit notification signals, such as to the device 200, using the 802.11 interface. Other embodiments may employ other suitable communications interfaces for connecting to or transmitting notification signals to device 200 or other devices, such as Bluetooth, infrared, or other wireless communications interfaces.

While FIG. 3 shows an embodiment comprising a television, in some embodiments, the system may comprise a different device, such as a DVR, DVD player, set-top box, computer, or other device capable of receiving streaming content and performing a part or the entirety of one or more methods according to this disclosure. In some such embodiments, the television may not be a smart television, or may not be configured appropriately to perform methods according to this disclosure. In some embodiments, the television 310 may be incorporated into the user device 200. For example, in one embodiment, device 200 may be configured to receive television broadcasts or other streaming content, such as from the Internet.

Referring now to FIG. 4A, FIG. 4A shows a system for enhanced television interaction according to one embodiment. In the embodiment shown in FIG. 4A, a smart television 310 is in communication via a Bluetooth connection with a user device 200, which is a tablet computer in this embodiment, though, as discussed above, it may be any other suitable user device, such as a smartphone, laptop computer, etc. While displaying content to the user, the television 310 monitors the received content stream and detects that an advertisement is playing. In this embodiment, the content includes metadata indicating that the content is an advertisement and that the advertisement is for a vacation package to the Caribbean. The smart television determines that the current viewer has been searching vacation related topics in the past week. The smart television then transmits a notification signal associated with the advertisement to the user device 200. In this embodiment, the notification signal comprises a haptic signal, though in some embodiments, the notification signal comprises a haptic signal and video signal to cause both a haptic effect and a display indicating that a commercial regarding a Caribbean vacation is provided on the screen. If the user taps or clicks on the displayed information, the television unmutes the advertisement to allow the user to hear the advertisement. In some embodiments, the notification signal may comprise a haptic effect and a link to the website associated with the displayed advertisement. Thus, if the user taps or clicks on the displayed information, the television unmutes the advertisement, and the user's device navigates to the website associated with the link.

FIG. 4B shows another embodiment of a system for enhanced television interaction according to this disclosure. In this embodiment, the user is interacting with her tablet computer while watching a television program on the smart television 310. While the television is receiving streaming content, it determines information about the television program that is being watched and also detects that one of the user's friends is also watching the program based on information provided by the friend on a social networking website. The smart television 310 generates and transmits a notification signal to the user's device 200 to cause a haptic effect and to provide a message that the user's friend is also watching the same television program. In this scenario, the user may be focused on the television and thus, the smart television transmits the notification signal to draw the user's attention to secondary information displayed on the user's tablet device 200. The user then can see that her friend is watching the same television show and is presented with options to send the friend a message or to update her status on the social networking website to indicate that she is also watching the television program. Thus, the smart television 310 is able to engage the user both with the television program, but also with the user's friends who may also be watching at the same time to allow them to message in real time, or simply to discuss the program the next time they meet in person. Other types of secondary information may be provided in a notification signal as well, such as links to web pages, product pages, video clips, character or cast information, review information, or other information that is associated with the content displayed on the television 310. Such secondary information may be embedded within the content itself, or may be identified by the smart television, or other device, and provided in one or more notification signals.

FIG. 4C shows a further example embodiment of a system for enhanced television interaction according to the present disclosure. In the embodiment shown in FIG. 4C, a smart television receives and displays streaming content, such as a television broadcast. During the broadcast, program segments may be separated by periods of advertisements. In some cases, a user may record such a television program for replay at a later time. During replay, the user may desire to fast forward through one or more advertisements that were recorded along with the television program. As the user begins to fast forward through the advertisements, the smart television (or in some cases the DVR or other equipment) may monitor the content as it is being fast forward to detect when an advertisement ends or when television programming resumes.

In the embodiment shown in FIG. 4C, as each advertisement ends, the smart television generates and transmits a notification signal to the user's device. The smart television determines characteristics of the notification signal based on whether an advertisement is followed by another advertisement or by the television programming. In cases where one advertisement is concluding and is followed by another advertisement, the smart television may generate and transmit notification signals having low intensity haptic signals. However, in the case where an advertisement is followed by the resumption of the television program, the smart television may generate and transmit a notification signal having a distinct haptic effect, such as a high intensity haptic effect, or a haptic effect with multiple repeating effects of increasing intensity.

In the embodiment shown in FIG. 4C, the smart television determines notification signals in real-time as the content is streamed, though in some embodiments, notification signals may be determined when a television program is recorded to a DVR (or other suitable recording device) and may be embedded within or associated with the recorded television program. Thus, when the program is later played back, the previously-generated notification signals may simply be output to the user's device. In some embodiments, notification signals may be applied to a program after it is recorded, such as by a digital video recorder device. In one embodiment, the DVR may process a recorded show to identify boundaries between each advertisement as well as between advertisements and the television program. In addition, the DVR may identify advertisements having particular relevance to the user and apply different notification signals to such advertisements, thus providing a customized notification experience for the user.

Reference is made throughout this specification to "notification signals." No particular function or intent should ascribed to the modifier "notification." Instead, "notification signal" is a convenient label to differentiate from other types of signals referred to in this specification. The term "notification signal" is intended to be read broadly and to encompass, for example, any signal carrying information related to events or other occurrences within, or portions of, content, or information related to or associated with content. Further, "notification signals" need not be signals triggered by any particular type of event or occurrence. Rather, the "notification signals" may simply correspond to a portion of the content having haptic information, as opposed to audio or video information.

In some embodiments discussed above, notification signals may be generated and transmitted to a user device 200 to affect the user's attention to provide additional, secondary information associated with content displayed on the television 310 or the device 200, such as to change the user's focus from her device 200 to the television 310, or from the television 310 to the device. Some embodiments, however, may provide effects intended to enhance the content displayed on the television. For example, in some embodiments, the television (or other device) may generate and transmit signals to the user's device 200 to provide a more immersive experience.

Referring now to FIG. 4D, FIG. 4D shows an example system for enhanced television interaction according to the present disclosure. In the embodiment shown in FIG. 4D, a viewer is watching a movie on a television 310. As the movie plays, various scenes having different themes and moods are played. To provide an enhanced viewing experience, the streaming content has haptic information embedded within it that is associated with different scenes or events within the movie. As the movie is received as streaming content, the embedded haptic information is identified and extracted. A notification signal comprising some or all of the haptic information is then generated and transmitted to the device 200 to cause the haptic effect. As can be seen in FIG. 4D, a suspenseful scene in the movie may have an associated haptic signal, which may be transmitted to the user's device 200 to provide a haptic effect to add additional tension to the scene. Later, upon transition to a scene having a significant surprising event, the television may receive haptic information associated with the event and generate and transmit a notification signal to the user's device. Such a notification signal may cause a high intensity haptic effect to amplify the sense of surprise in the scene. And later in the movie during a chase scene, the television may receive further haptic information associated with the movie. For example, haptic effects associated with portions of the chase scene may cause the television to generate and transmit one or more notification signals to the user's device to coincide with events occurring during the chase scene, such as the sudden appearance of an obstacle or enemy, a slow-motion jump over a chasm, or other event. Thus, the embodiment shown in FIG. 4D may provide an enhanced viewing experience by supplementing the visual and audio portions of the movie with tactile or haptic sensations.

A number of embodiments discussed herein have been discussed in the context of a single user viewing content and interacting with a user device. However, the disclosure is not limited to a single user or a single user device. Rather, embodiments may comprise multiple users or multiple user devices 200, and may further include multiple display devices 310. In some such embodiments, users may be provided with different notification signals. For example, users may have differing preferences regarding the types of effects they receive, or may specify different intensity levels for applied effects. Further, in some embodiments, a user's location relative to a display screen may affect the types or contents of notification signals. For example, users located to the left side of a display 310 may receive different effects, or different intensities for effects, than those located on the right side of the screen. In one embodiment, users located on the left side of the screen may receive higher intensity effects associated with events occurring the left side of the screen, and lesser intensity effects associated with events occurring or the right side of the screen. Similarly, users located further away from the screen may receive lower intensity effects than those closer to the screen. In some embodiments, users may receive different secondary information associated with content on the screen based upon user preferences or profile information about the user, such as age, sex, education level, income, etc. In some embodiments, the users may view differing secondary information on a separate display screen, such as on their respective user device or in a wearable device, and thus different haptic effects may be provided to correspond to the secondary information for each particular user.

Referring now to FIG. 5, FIG. 5 shows a device for enhanced television interaction according to one embodiment. As can be seen in FIG. 5, a user may watch television in a variety of postures based on their focus. As noted above, the television may transmit notification signals to signal the user to shift their focus from the television to the user's device, or the reverse. In embodiments in which the user device 200 comprises the television 310 device, the user's focus may be determined based on whether a display window displaying streaming content is in the foreground or in the background in the user interface. Embodiments according to this disclosure may obtain additional information regarding a user's focus based on the user's posture or the position of device. In some embodiments, a user device 200 may include one or more sensors capable of sensing the position or orientation of the device, or the type of contact or grip used to hold the device. In one such embodiment, the device may comprise a sensor, such as an accelerometer or a camera, capable of sensing an orientation of the device or whether the user is looking at the device from which the device may infer a user's focus on the device.

As may be seen in FIG. 5, when a user is watching the television, the user may have a relaxed posture, where she is leaning back in a chair or sofa and may be holding her device such that the screen of the device is angled downward or at an angle substantially halfway between horizontal and vertical, indicating that the user is not focused on the device. In such an embodiment, the television may receive information from the device indicating the user's probable focus on the television, which may cause the television to generate notification signals associated with events that are configured to draw the user's attention to the user device. In contrast, if the user's posture or the orientation of the device indicates that the user is likely focused on the device, the television may tend to generate notification signals intended to draw the user's focus to the television.

In some embodiments, the device may also reconfigure its user interface into a simpler user interface having fewer commands with larger areas on the screen. For example, in one embodiment, the user's device is configured to operate as a remote control for the television. In one such embodiment, when the device determines that the user is likely not focused on the device, or is only partially focused on the device, the user interface may change to display a reduced set of controls (e.g. user interface 510), such that the user need not closely examine the device or use fine movements to effectuate a particular action. However, if the user changes posture or grip, the user interface may change to provide a greater number of controls or more intricate user interface capabilities, such as may be seen in user interface 530. For example, if the user is holding the device in two hands in a horizontal orientation, the device may determine that the user is highly focused on the device and may provide a more detailed user interface, such as providing additional options or a graphical keyboard or number pad for accepting user input.

While embodiments may provide a rearrangement of a user interface based on the user's detected posture, in some embodiments, the user interface based on a user's usage pattern of a device. For example, if a user frequently watches channel 31, the user interface may incorporate a button to quickly change the channel to channel 31. Or in some embodiments, if the user rarely or never uses a particular features, such as a mute button or rarely changes the input source for the television, such buttons may be reduced in size, or moved onto a secondary screen of the user interface, such that the most frequently used controls are both presented on the primary user interface screen and sized such that they are easily identifiable and usable. In some embodiments, certain preferences associated with a user may be stored by the device. For example, if the user frequently watches one or more television programs, that information may be stored on the device such that if the user arrives in a new location, the device is able to determine the local television channels and present controls to the user to allow the user to quickly navigate to the user's favorite television shows, without needing to learn a new channel arrangement. In some embodiments, the device may provide a display of a guide control that provides information regarding the local playtimes of the user's favorite shows, thus allowing the user to learn and accommodate a different programming schedule.

In addition to, or instead of, modifying the visual appearance of the user interface, some embodiments may modify haptic effects associated with the user interface. For example, haptic effects may be added to certain user interface elements, such as buttons, such as to frequently used buttons, which may allow a user to use the user interface without looking at it, or to warn the user before using an infrequently used interface element. In one embodiment, frequently used buttons or interface elements may be associated with haptic effects having stronger effects, while infrequently used buttons may have weak or no associated haptic effects.

In some embodiments, the user interface may also adjust to accommodate the user's preferred methods of performing certain tasks. For example, in one embodiment, the user may frequently issue voice commands to the device. Thus, the device may incorporate such voice commands with traditional input controls. For example, the user may dislike using the keyboard on the device and speak the name of a desired program to watch and press a channel change button. The device may then interpret the user's input to indicate that the user wishes to watch the program and then issue commands to the television or other device to power the device on (if it is not already) and to change the channel to the desired program.

By allowing the user interface to evolve and incorporate user preference information, the user may have an easier time adjusting to different locations or display devices. For example, the user may not need to research channel and guide information in different locations (e.g. if the user is a frequent traveler), or need to learn different remote controls or control interfaces for different devices.

Figure 6:
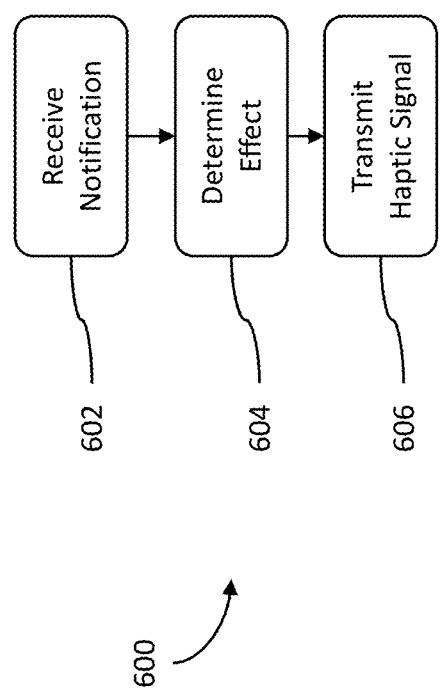
FIGS. 6-8 show methods for enhanced television interaction according to embodiments.

Referring now to FIG. 6, FIG. 6 shows a method for enhanced television interaction according to one embodiment. FIG. 6 is described with respect to a software application executed by the device 200 shown in FIG. 2; however, the methods disclosed herein are not limited to execution by only the device shown in FIG. 2, but rather may be executed by any suitable electronic system.

The embodiment shown in FIG. 6 begins in block 602 when the processor 200 receives notification information. In the embodiment shown in FIG. 6, the notification information indicates an event associated with video content displayed by a television device 310 and includes an indication of a haptic effect to be output by the device 200. For example, in one embodiment, the notification signal comprises a high-level signal, such as a signal that includes an identifier of a preinstalled haptic effect on the user's device. Upon receipt of the identifier, the user device may identify the pre-installed haptic effect and generate the corresponding haptic effect. In some embodiments, the notification signal may comprise additional parameters, such as a duration, a magnitude, a frequency, an envelope describing characteristics of a haptic effect, a degree of freedom, a direction, a particular haptic output device to be used, an effect type (e.g. vibration, deformation, frictional, etc.), or other parameter associated with one or more haptic effects. In some embodiments, the notification signal may comprise low level haptic information, such as a waveform or parameters of a mathematical function describing the haptic effect to be generated. After the processor 200 has received the notification signal, the method proceeds to block 604.

In block 604, the processor determines a haptic effect associated with the notification information. For example, in one embodiment, the processor 220 receives notification comprising an identifier of a pre-installed haptic effect. The processor extracts the identifier from the notification and accesses haptic effect information associated with the identifier. For example, the haptic effect information may be stored in a computer-readable medium within the device, such as on a flash memory device. In some embodiments, the identifier may comprise a uniform resource locator (URL) indicating a location on a remote device where the haptic effect information may be found and retrieved.

Further embodiments may comprise both an identifier and haptic effect information to be used to generate a haptic effect. In one such embodiment, such a notification may be used to both generate a haptic effect and to temporarily or permanently install a haptic effect on the device for later reuse. For example, a television series may have one or more haptic effects associated with it that may be installed onto a user's device by the smart television and, after the effects, or library of effects, have been installed on the user's device, the television may subsequently refer to effects by identifier rather than re-transmitting the haptic effect information. In some embodiments, if a haptic identifier indicates a haptic effect that is not installed on the device, the device may transmit a signal to the television requesting the haptic effect information associated with the identifier, which may cause the television to provide the haptic effect information or to provide a URL from which the haptic effect information, or library of haptic effect information may be retrieved and installed. For example, a user who enjoys a particular television series may have the series' haptic library installed on her device the first time she watches a show in the series. After haptic effect has been determined, the method proceeds to block 606.

In block 606, the processor 220 generates and transmits a haptic signal to a haptic output device, such as haptic output device 240, the haptic signal configured to cause the haptic output device to output the haptic effect. For example, after retrieving haptic effect information associated with a notification signal, the processor may generate a haptic signal based on parameters from the haptic information, such as frequency, duration, magnitude, etc. In some embodiments, the processor 220 may generate a haptic signal identifying a haptic effect already installed within a haptic output device such that the processor 220 need only identify the desired haptic effect to output. After generating the haptic signal, the processor 220 transmit the signal to the haptic output device to cause the haptic output device to output the haptic effect. After the processor 220 transmits the haptic signal, the method concludes, or it may return to either of blocks 602 or 604 to receive further notification signals, or to determine additional haptic effects, such as in the case where a notification signal comprises information associated with multiple haptic effects.

Figure 7:
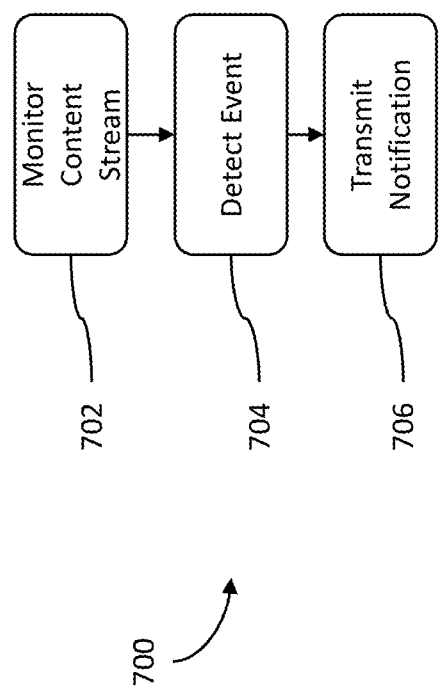

Referring now to FIG. 7, FIG. 7 shows a method for enhanced television interaction according to one embodiment. FIG. 7 is described with respect to a software application executed by the television 310 shown in FIG. 3; however, the methods disclosed herein are not limited to execution by only the television 310 shown in FIG. 3, but rather may be executed by any suitable electronic system.

The method of FIG. 7 begins in block 702 when the television 310 monitors a content stream received by the television where the content stream comprises video and audio data to be displayed by a television device. For example, in one embodiment, the television 310 is configured to receive a digital content stream comprising multimedia content by analyze data associated with the content stream to identify haptic information or other metadata associated with the content stream. In some embodiments, a content stream may comprise a television program, movie, advertisement, or other audio, visual, or multimedia content that has had additional information associated with it prior to transmission from the content provider. For example, information associated with a content stream may indicate the presence of a particular event, such as a rocket blasting off or an explosion, or a sequence of events, such as a chase scene. In such an embodiment, the television 310 may be configured to monitor a content stream for such information, such as for the information itself or an indicator indicating the presence of such content. In some embodiments, a content stream may have been originally produced with haptic information, in which case, the television 310 may monitor the content stream for an indicator indicating the presence of such haptic information, or may simply monitor for the haptic information.

In some embodiments, content may not comprise any haptic information. In one such embodiment, the television 310 may monitor the content stream for audio or video characteristic that might indicate certain events. For example, the television 310 may comprise one or more audio recognition components to identify certain audio events, such as running engines, creaking floorboards, screeching tires, suspenseful music, screaming or yelling, fighting, whispered speech, or other audio characteristics that may indicate one or more events occurring within the content. In some embodiments, the television 310 may be configured to monitor a content stream to identify, recognize, and analyze speech within a content stream. In some embodiments, the television 310 may be configured to recognize certain video information, such as planes, trains, cars, boats, beaches, explosions, fires, etc., or to learn to recognize people that appear frequently appear within video content, or have information to allow recognition of prominent actors, which may allow the television to recognize main characters within the content. While monitoring a content stream, the method proceeds to block 704.

In block 704, the television 310 detects an event within the content stream. For example, while monitoring the content stream, in one embodiment, the television may detect an event by identifying certain information associated with the content stream. For example, as discussed above, information associated with a content stream may indicate the occurrence of an event, such as an explosion or a car accident. In some embodiments, an event may occur during a very brief period of time, such as during a single frame of video or over a period of a second or two, while in some embodiments, an event may span a significant amount of time or an entire scene (or scenes) within a content stream, such as a scene on a ship or in an airplane, where an event such as a running engine may be detected. In some embodiments, the television 310 may detect that an advertisement has interrupted a television program or that the content stream includes a featured product associated with an advertisement. For example, in one embodiment, the content stream may have associated information indicating an advertisement associated with a particular scene in a content stream, and the television 310 may detect that an advertising event has occurred.

In some embodiments, the television 310 may be configured to detect an event based on recognized audio or video. As discussed above, the television 310 may be configured to identify certain audio or video information, such as certain sounds or images. Further, in some embodiments, the television 310 may recognize events based on a correspondence between certain audio information and certain video information. For example, if the television detects a creaking floorboard and a darkened scene with a human silhouette, the television may determine a scary scene is occurring. In another embodiment, if the television detects the sound of a wave crashing and detects video of a beach, the television may determine that a relaxing scene is occurring. After detecting an event, the method proceeds to block 706.

In block 706, the television 310 generates and transmits a notification signal to a user device 200. For example, in one embodiment, the television 310 generates a notification signal comprising a haptic signal. The haptic signal, in this embodiment, comprises an identification of a haptic effect to be output and a magnitude and duration of the effect to be output. In some embodiments, however, the haptic signal may comprise waveform information describing the effect to be output, or spatial information indicating a region on a device to which a frictional or deformation effect is to be applied, as well as information regarding tactile characteristics of a frictional or deformation effect that is to be applied. In some embodiments, a plurality of haptic effects may be incorporated within a notification signal, or a notification signal may transmit one or more haptic effects to be stored on the device 200 for later access. For example, as discussed above, a television series may have a certain set of haptic effect associated with it. If the television 310 detects that an episode of the television program is beginning, the television 310 may generate and transmit a notification signal to the device requesting information regarding whether the device has the haptic effect library associated with the television program stored within its memory. If the device responds negatively, the television 310 may generate and transmit a notification signal comprising part or all of the set of haptic effects, or it may comprise a URL of a location from which the haptic effect library may be accessed or retrieved.

In some embodiments, a notification signal may comprise information that complements or enhances content being displayed by the television. For example, in one embodiment, the television may generate and transmit a notification signal comprising a haptic effect that is configured to enhance the suspense in a scene, such as by providing a subtle vibration to the device associated with a person moving through a darkened house and then providing a sharp jolting effect when the villain appears in a doorway. In some embodiments, the notification signal may comprise a haptic signal configured to generate a haptic effect associated with an ambient condition within the content stream, such as a car engine or a boat sailing through rough water.

In some embodiments, a generated notification signal may comprise a URL of a haptic effect to be output, or of an advertisement to be displayed. For example, as discussed above, the television 310 may detect an event associated with an advertisement or with a product shown within a content stream. After detecting such an event, the television 310 may generate and transmit a notification signal comprising advertisement information. For example, in one embodiment, the notification signal may comprise a URL to a product's website, or the notification signal may comprise an advertisement or coupon to be displayed on the user's device. In some embodiments, the notification signal may comprise a haptic effect configured to draw the user's attention to advertisement displayed on the user's device.

After (or while) generating and transmitting the notification signal, the method may return to block 702 and the television may continue to monitor the content stream.

While the method of FIG. 7 was described with respect to a television 310 monitoring a content stream, any other suitable device that has access to a content stream may perform the method. For example, a set top box from a cable company, a DVD player, a device that streams content from a content provider (e.g. Netflix™), etc. Such devices may perform such a method in addition to, or instead of, the television 310.

Figure 8:
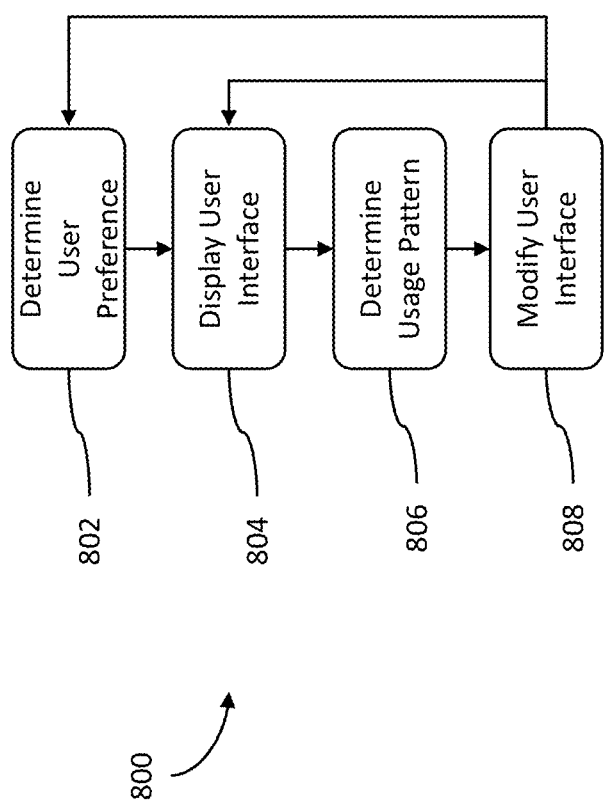

Referring now to FIG. 8, FIG. 8 shows a method for enhanced television interaction according to one embodiment. FIG. 8 is described with respect to a software application executed by the device 200 shown in FIG. 2; however, the methods disclosed herein are not limited to execution by only the device 200 shown in FIG. 3, but rather may be executed by any suitable electronic system.

The method of FIG. 8 begins in block 802 where the device determines a user preference. In some embodiments, the user may be able to directly provide user preferences, such as by configuring the arrangement of controls on one or more displayed user interfaces, or by creating one or more profiles associated with different users. Further, the user may be able to provide user preference information relating to different contexts, such as if the user is watching television or a movie, or if the user is focused on the device 200 or is not focused on the device 200 or is not holding the device 200. For example, in one embodiment, the device determines that the user prefers to see detailed information regarding the program the user is watching and to have basic controls available, such as channel and volume controls, or video playback controls (e.g. play, pause, rewind, etc.). One such embodiment may be seen in FIG. 5. However, user preference information may also comprise information related to the user's focus on the device. For example, as discussed above with respect to FIG. 5, the user may prefer that when the user is focused on watching content on a television 310, the device should only display a minimal set of controls with large buttons. As may be seen in FIG. 5, only a small set of basic controls is displayed when the user is reclining while watching television 310 or while the user is watching television 310 and not in physical contact with the device 200.

In some embodiments, the device 200 may determine that the user rarely changes a video source on a television and only uses volume controls associated with a separate audio/visual receiver device. In one such embodiment, the device 200 may determine that the video source selector control should not be displayed on the primary interface screen, but should only be available through a menu of options available if the user swipes the primary screen to present a secondary (or tertiary, or other) set of controls. In addition, the device may select controls that initiate commands to a television 310, but only select volume controls that initiate commands to the A/V receiver, while not displaying volume controls for the television 310. In some embodiments, the device may determine that the user prefers to hold the device in her right hand and thus, controls should be arranged to accommodate a right-handed grip on the device.

In some embodiments, the device may determine a user preference based on sensed information about the device. For example, in some embodiments, the device 200 may comprise one or more sensors 290 capable of sensing an orientation or movement of the device, or whether the device is being grasped or not. Such sensor information may be used to determine an applicable user preference. For example, if a device determines that it is not being grasped by a user based on sensor information, the device may determine a first set of user preferences. If the device later receives a sensor signal indicating the device is being grasped, the device may determine a second set of user preferences is applicable. Still further sets of user preferences may be determined based on other sensed information, such as an orientation that indicates that the user is focused on the device as may be seen in FIG. 5. After determining the user's preferences, the method proceeds to block 804.

In block 804, the device 200 displays the user interface. For example, after determining the user's preferences, the device displays the controls having a certain sizes and at location determined to correspond to the user's preference. In the embodiment shown in FIG. 5, two different displayed user interfaces are provided. The first interface 510, corresponds to a determined user preference associated with the user not contacting the device, or holding the device in a way that indicates that the user is not focused on the device. The device may also display non-visual information, such as an audio effect or a haptic effect that a user interface configuration has changed based on the user's preferences. For example, if the user stops focusing on the device, and relaxes to watch a television program, the device may reconfigure the displayed interface according to the user's preferences and may provide an audio or haptic effect to notify the user of the changed interface. After displaying the user interface, the method proceeds to block 806.

In block 806, the device 806 determines a usage pattern of the device or the user interface. For example, the device may monitor the user's use of one or more controls displayed on the device. For example, if a user frequently uses a particular control, the device may increase a weighting score associated with the control. Or, if the user frequently watches particular programs or applies particular volume settings, the device may store information associated with such usage patterns. In one embodiments, the device may monitor other applications the user uses while watching content on television, such as a web browsing application or an application that provides information about actors, plot summaries, or reviews. In some embodiments, the device may monitor sensed information to determine usage patterns. For example, in one embodiment, the device may monitor an orientation of the device while the user watches content displayed on a television to learn whether a user is focusing on the device or the television. After determining a usage pattern, the method proceeds to block 808.

In block 808, the device modifies the user interface. For example, in one embodiment, the device 200 modifies the user interface by adding or removing controls within the user interface. In one embodiment, the device 200 determines that the user frequently accesses an application installed on the device 200 to retrieve detailed information about the casts of various shows or movies. The device 200 modifies the user interface to include a control to allow the user to quickly access the application. In one embodiment, the device 200 determines that the user usually sets the volume to a particular setting when viewing content, thus the device 200 re-sizes a volume control that would be used to adjust the volume to the desired level. For example, if the current volume is below the user's typical desired level, the user interface may be modified to increase the size of the "volume up" control to allow the user to easily increase the volume to the typical level. As discussed above, in some embodiments, the device 200 may modify the user interface by displaying an alternate user interface or by modifying or changing haptic effects associated with interface elements.

For example, as discussed above with respect to FIG. 5, the device may display a different user interface depending on the user's detected focus on the device. If the user is focused on the device, the device 200 may display a first user interface (e.g. interface 520), while if the user is not focused on the device, the device 200 may display a second user interface (e.g. interface 510). In some embodiments, the device may reduce the intensity of haptic effects if the device determines that the user is focused on the device, while increasing the intensity of haptic effects if the user is not focused on the device. Or in some embodiments, a device may apply frictional effects to certain buttons or interface elements if the user is not focused on the device to aid the user in locating such buttons or elements without the need for visual cues. Further, in some embodiments, the user may frequently press a "fast forward" button three times to reach a maximum "fast forward" speed. In one embodiment, the device may modify the user interface to only require the user to press the fast forward button once to reach maximum speed, but provide three haptic effects to indicate that maximum speed is being used. After modifying the user interface, the method may return to block 802, such as if the user changes user preference information, or the method may return to block 804 to display the modified user interface.

While the methods and systems herein are described in terms of software executing on various machines, the methods and systems may also be implemented as specifically-configured hardware, such as field-programmable gate array (FPGA) specifically to execute the various methods. For example, embodiments can be implemented in digital electronic circuitry, or in computer hardware, firmware, software, or in a combination thereof. In one embodiment, a device may comprise a processor or processors. The processor comprises a computer-readable medium, such as a random access memory (RAM) coupled to the processor. The processor executes computer-executable program instructions stored in memory, such as executing one or more computer programs for editing an image. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example computer-readable media, that may store instructions that, when executed by the processor, can cause the processor to perform the steps described herein as carried out, or assisted, by a processor. Embodiments of computer-readable media may comprise, but are not limited to, an electronic, optical, magnetic, or other storage device capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code for carrying out one or more of the methods (or parts of methods) described herein.

The foregoing description of some embodiments of the invention has been presented only for the purpose of illustration and description and is not intended to be exhaustive or to limit the invention to the precise forms disclosed. Numerous modifications and adaptations thereof will be apparent to those skilled in the art without departing from the spirit and scope of the invention.

Reference herein to "one embodiment" or "an embodiment" means that a particular feature, structure, operation, or other characteristic described in connection with the embodiment may be included in at least one implementation of the invention. The invention is not restricted to the particular embodiments described as such. The appearance of the phrase "in one embodiment" or "in an embodiment" in various places in the specification does not necessarily refer to the same embodiment. Any particular feature, structure, operation, or other characteristic described in this specification in relation to "one embodiment" may be combined with other features, structures, operations, or other characteristics described in respect of any other embodiment.

That which is claimed is:

1. A method comprising:
   receiving, by a secondary device and from a television system component, a query signal requesting information regarding whether a haptic effect library associated with a particular television program is installed on the secondary device, wherein the query signal is transmitted from the television system component in response to detecting that the particular television program is being watched for a first time;
   in response to receiving the query signal, transmitting, by the secondary device, a signal to the television system component indicating that the haptic effect library is not installed;
   after transmitting the signal to the television system component, receiving by the secondary device and from the television system component, haptic effect data configured to be used by the secondary device to install the haptic effect library on the secondary device;
   in response to receiving the haptic effect data, installing, by the secondary device, the haptic effect library using the haptic effect data;
   receiving a notification signal, by the secondary device and from the television system component, the notification signal comprising notification information indicating an event associated with the particular television program;
   determining, by the secondary device, a haptic effect within the haptic effect library and associated with the notification information; and
   generating and transmitting, by the secondary device, a haptic signal to a haptic output device, the haptic signal configured to cause the haptic output device to output the haptic effect.

2. The method of claim 1, further comprising:
   generating and transmitting a video signal to a display device positioned on the secondary device.

3. The method of claim 1, further comprising:
   receiving secondary information that is associated with the particular television program;
   monitoring the secondary information;
   detecting another event associated with the secondary information; and
   based on detecting the other event, generating and transmitting a second haptic signal to the haptic output device, the second haptic signal configured to cause the haptic output device to output the haptic effect.

4. The method of claim 1, further comprising receiving an input from an input device, and wherein the input comprises a sensed physiological condition of a user and the haptic signal is based on the sensed physiological condition.

5. The method of claim 1, wherein the haptic signal is based on information associated with video content and information from a social networking account.

6. The method of claim 1, wherein the notification information comprises information associated with a status of a user of a social networking site and video content.

7. The method of claim 1, further comprising generating and transmitting an audio signal to a speaker, the audio signal based on the notification information.

8. The method of claim 1, wherein:
the haptic effect data comprises a uniform resource locator (URL); and
installing the haptic effect library using the haptic effect data comprises downloading the haptic effect library from a remote device using the URL and temporarily installing the haptic effect library.

9. The method of claim 8, wherein the notification signal comprises:
the haptic effect data configured to be used to install the haptic effect library; and
the notification information indicating the event associated with the particular television program.

10. The method of claim 1, wherein the secondary device comprises a wearable device.

11. The method of claim 1, wherein the television system component comprises a television, a digital video recorder (DVR), a digital video disc (DVD) player, or a set-top box.

12. A method comprising:
detecting, by a television system component, that a particular television program is being watched for a first time;
in response to detecting that the particular television program is being watched for the first time, transmitting, by the television system component, a query signal to a secondary device requesting information regarding whether a haptic effect library associated with the particular television program is installed on the secondary device;
after transmitting the query signal, receiving, by the television system component and from the secondary device, a signal indicating that the haptic effect library is not installed on the secondary device;
in response to receiving the signal indicating that the haptic effect library is not installed, transmitting, by the television system component and to the secondary device, haptic effect data configured to be used by the secondary device to install the haptic effect library on the secondary device;
monitoring, by the television system component, a content stream comprising video data and audio data associated with the particular television program;
detecting, by the television system component, an event within the content stream; and
generating and transmitting, by the television system component, a notification signal associated with the event to the secondary device, notification signal configured to cause the secondary device to use the haptic effect library to determine a haptic effect to output.

13. The method of claim 12, further comprising transmitting secondary information to the secondary device, the secondary information associated with the content stream and configured to be visually displayed by the secondary device.

14. The method of claim 12, wherein the secondary device comprises a smartphone or a remote control.

15. The method of claim 12, wherein the notification signal comprises the haptic effect or an audio effect.

16. The method of claim 12, wherein the notification signal comprises a first notification signal that is configured to cause a first secondary device to output a first haptic effect and a second notification signal that is configured to cause a second secondary device to output a second haptic effect that is different from the first haptic effect.

17. The method of claim 16, wherein the first secondary device is configured to control the television system component and the first haptic effect is configured to prompt a user to take action.

18. The method of claim 12, wherein detecting the event within the content stream comprises:
analyzing the audio data to detect the occurrence of the event; or
analyzing the video data to detect the occurrence of the event.

19. The method of claim 12, wherein detecting the event within the content stream comprises determining a correspondence between the audio data and the video data.

20. The method of claim 12, wherein the content stream comprises a primary program, and the event is not associated with the interruption of the primary program.

21. A non-transitory computer-readable medium comprising program code configured to be executed by a processor of a secondary device to cause the processor to:
receive, from a television system component, a query signal requesting information regarding whether a haptic effect library associated with a particular television program is installed on the secondary device, wherein the query signal is transmitted from the television system component in response to detecting that the particular television program is being watched for a first time;
in response to receiving the query signal, transmit a signal to the television system component indicating that the haptic effect library is not installed on the secondary device;
after transmitting the signal to the television system component, receive from the television system component haptic effect data configured to be used by the secondary device to install the haptic effect library on the secondary device;
in response to receiving the haptic effect data, install the haptic effect library using the haptic effect data;
receive a notification signal from the television system component and comprising notification information indicating an event associated with the particular television program;
determine a haptic effect within the haptic effect library and associated with the notification information; and
generate and transmit a haptic signal to a haptic output device, the haptic signal configured to cause the haptic output device to output the haptic effect.

22. The non-transitory computer-readable medium of claim 21, further comprising program code configured to cause the processor to:
generate and transmit a video signal to a display device of the secondary device.

23. The non-transitory computer-readable medium of claim 21, further comprising program code configured to cause the processor to:
- receive secondary information that is associated with the particular television program;
- monitor the secondary information;
- detect another event associated with the secondary information; and
- based on detecting the other event, generate and transmit a second haptic signal to the haptic output device, the second haptic signal configured to cause the haptic output device to output the haptic effect.

24. The non-transitory computer-readable medium of claim 21, further comprising program code configured to cause the processor to receive an input from an input device, and wherein the input comprises a sensed physiological condition of a user and the haptic signal is based on the sensed physiological condition.

25. The non-transitory computer-readable medium of claim 21, wherein the haptic signal is based on information associated with video content and information from a social networking account.

26. The non-transitory computer-readable medium of claim 21, wherein the notification information comprises information associated with a status of a user of a social networking site and video content.

27. The non-transitory computer-readable medium of claim 21, further comprising program code configured to cause the processor to generate and transmit an audio signal to a speaker, the audio signal based on the notification information.

28. A non-transitory computer-readable medium comprising program code configured to be executed by a processor of a television system component to cause the processor to:
- detect that a particular television program is being watched for a first time;
- in response to detecting that the particular television program is being watched for the first time, transmit a query signal to a secondary device requesting information regarding whether a haptic effect library associated with the particular television program is installed on the secondary device;
- after transmitting the query signal, receive from the secondary device a signal indicating that the haptic effect library is not installed on the secondary device;
- in response to receiving the signal indicating that the haptic effect library is not installed, transmit to the secondary device haptic effect data configured to be used by the secondary device to install the haptic effect library on the secondary device;
- monitor a content stream comprising video and audio data associated with the particular television program;
- detect an event within the content stream; and
- generate and transmit a notification signal associated with the event to the secondary device, the notification signal configured to cause the secondary device to use the haptic effect library to determine a haptic effect to output.

29. The non-transitory computer-readable medium of claim 28, further comprising program code configured to cause the processor to transmit secondary information to the secondary device, the secondary information associated with the content stream and configured to be visually displayed by the secondary device.

30. The non-transitory computer-readable medium of claim 28, wherein the secondary device comprises a smartphone or a remote control.

31. The non-transitory computer-readable medium of claim 28, wherein the notification signal comprises the haptic effect or an audio effect.

32. A method comprising:
- detecting, by a computing device, that particular video data is being watched for a first time;
- in response to detecting that the particular video data is being watched for the first time, transmitting, by the computing device, a query signal to a secondary device requesting information regarding whether a haptic effect library associated with particular video data is installed on the secondary device;
- after transmitting the query signal, receiving, by the computing device and from the secondary device, a signal indicating that the haptic effect library is not installed on the secondary device;
- in response to receiving the signal indicating that the haptic effect library is not installed, transmitting, by the computing device and to the secondary device, haptic effect data configured to be used by the secondary device to install the haptic effect library on the secondary device;
- receiving, by the computing device, a content stream comprising the particular video data, audio data, and event data;
- monitoring, by the computing device, the content stream to detect an event associated with the event data in the content stream;
- generating, by the computing device, a haptic signal associated with the event, the haptic signal configured to cause a haptic output device to output a haptic effect included within the haptic effect library; and
- transmitting, by the computing device, the haptic signal to the secondary device, the haptic signal configured to cause the secondary device to output the haptic effect.

33. A non-transitory computer-readable medium comprising program code configured to be executed by a processor of a computing device to cause the processor to:
- detect that particular video data is being watched for a first time;
- in response to detecting that the particular video data is being watched for the first time, transmit a query signal to a secondary device requesting information regarding whether a haptic effect library associated with particular video data is installed on the secondary device;
- after transmitting the query signal, receive, from the secondary device, a signal indicating that the haptic effect library is not installed;
- in response to receiving the signal indicating that the haptic effect library is not installed, transmit, to the secondary device, haptic effect data configured to be used by the secondary device to install the haptic effect library on the secondary device;
- receive a content stream comprising the particular video data, audio data, and event data;
- monitor the content stream to detect an event associated with the event data in the content stream;
- generate a haptic signal associated with the event, the haptic signal configured to cause a haptic output device to output a haptic effect included within the haptic effect library; and
- transmit the haptic signal to the secondary device, the haptic signal configured to cause the secondary device to output the haptic effect.

* * * * *